US012473231B2

(12) United States Patent
Ballschuh et al.

(10) Patent No.: US 12,473,231 B2
(45) Date of Patent: Nov. 18, 2025

(54) HYDROPHOBIZING AGENT FOR MINERAL MATERIALS

(71) Applicant: PAGEL SPEZIAL-BETON GMBH & CO. KG, Essen (DE)

(72) Inventors: Detlef Ballschuh, Berlin (DE); Horst Seibt, Berlin (DE); Andreas Gerdes, Karlsruhe (DE); Julia Süssmuth, Ettlingen (DE); Patrick Schäffel, Erkrath (DE)

( * ) Notice: Subject to any disclaimer, the term of this patent is extended or adjusted under 35 U.S.C. 154(b) by 753 days.

(21) Appl. No.: 17/603,708

(22) PCT Filed: Apr. 14, 2020

(86) PCT No.: PCT/EP2020/060478
§ 371 (c)(1),
(2) Date: Oct. 14, 2021

(87) PCT Pub. No.: WO2020/212357
PCT Pub. Date: Oct. 22, 2020

(65) Prior Publication Data
US 2022/0194853 A1    Jun. 23, 2022

(30) Foreign Application Priority Data
Apr. 15, 2019   (EP) .................... 19169214

(51) Int. Cl.
C04B 24/26    (2006.01)
C04B 14/06    (2006.01)
C04B 24/42    (2006.01)
C04B 28/14    (2006.01)
C04B 103/00   (2006.01)
C04B 103/65   (2006.01)

(52) U.S. Cl.
CPC .......... C04B 24/2652 (2013.01); C04B 14/06 (2013.01); C04B 24/2647 (2013.01); C04B 24/42 (2013.01); C04B 28/14 (2013.01); C04B 2103/0005 (2013.01); C04B 2103/65 (2013.01)

(58) Field of Classification Search
CPC .............................. C04B 14/06; C04B 24/42
See application file for complete search history.

(56) References Cited

U.S. PATENT DOCUMENTS

| | | | |
|---|---|---|---|
| 6,139,622 A | 10/2000 | Gobel et al. | |
| 6,555,225 B1 | 4/2003 | Yoshioka et al. | |
| 6,824,607 B2 | 11/2004 | Baeuml et al. | |
| 8,268,939 B2 | 9/2012 | Ebbrecht et al. | |
| 8,883,932 B2 | 11/2014 | Brugger et al. | |
| 8,993,706 B2 | 3/2015 | Schubert et al. | |
| 9,040,608 B2 | 5/2015 | Friedel et al. | |
| 2009/0240004 A1 | 9/2009 | Maier et al. | |
| 2011/0282024 A1 | 11/2011 | Weissenbach et al. | |
| 2012/0028022 A1 | 2/2012 | Brugger et al. | |
| 2020/0330363 A1* | 10/2020 | Shiroya | A61K 8/06 |

FOREIGN PATENT DOCUMENTS

| | | |
|---|---|---|
| DE | 2333207 A1 | 1/1974 |
| DE | 19747794 A1 | 5/1999 |
| DE | 10220659 A1 | 11/2003 |
| DE | 69920391 T2 | 2/2006 |
| DE | 102006046368 A1 | 4/2008 |
| DE | 102008041920 A1 | 3/2010 |
| DE | 102009022628 A1 | 6/2010 |
| DE | 102009028640 A1 | 2/2011 |
| DE | 102010003868 A1 | 10/2011 |
| DE | 102010003870 A1 | 10/2011 |
| DE | 102010038768 A1 | 2/2012 |
| DE | 102010038774 A1 | 2/2012 |
| EP | 0796826 A1 | 9/1997 |
| EP | 1289905 B1 | 2/2006 |
| EP | 2415797 A1 | 2/2012 |
| KR | 20130119586 A | 11/2013 |
| WO | 2007009935 A2 | 1/2007 |

(Continued)

OTHER PUBLICATIONS

International Preliminary Report on Patentability for International Application No. PCT/EP2020/060478, mailed Sep. 28, 2021, 4 pages.
R. A. Deschenes Jr. et al. "Mitigating Alkali-Silica Reaction and Freezing and Thawing in Concrete Pavement by Silane Treatment", ACI Materials Journal, vol. 115, No. 5, Sep. 1, 2018, pp. 685-694.
H. Staudinger et al. "Über hochpolymere Verbindungen, 156. Mitteil.: Untersuchungen an hochmolekularen Polyammonium-Verbindungen", Berichte der Deutschen Chemischen Gesellschaft, vol. 70, No. 5, May 5, 1937, pp. 879-1162. English translation not available.
H. Deuel et al. "Flockungsreaktionen zwischen polymeren Sauren und polymeren Basen", Helvetica Chimica Acta, vol. 36, No. 6, 1953, pp. 1671-1680. English translation not available.
H.F. Mark et al. "Encyclopedia of Polymer Science and Technology", John Wiley and Sons, vol. 10, 1969, pp. 765-780.
International Search Report for corresponding PCT/EP2020/060478, Mailed Jul. 1, 2020, 2 Pages.

*Primary Examiner* — Wenwen Cai
(74) *Attorney, Agent, or Firm* — Armstrong Teasdale LLP

(57) ABSTRACT

Described herein is a hydrophobizing agent for mineral materials, including: a polyion complex (i) including at least one polycation (i.1) and at least one polyanion (i.2), where the molar ratio of polycation:polyanion in the polyion complex is ≥1; and a silicone compound composition (ii). Also described herein are a process for producing the hydrophobizing agent, a method of using the hydrophobizing agent for the hydrophobizing of mineral binders and/or compositions which contain mineral binders and/or materials which include mineral binders, and a binder composition including one or more mineral binder(s) and a corresponding hydrophobizing agent. Also described herein is a process for hydrophobizing materials which include mineral binders, and a hydrophobized material including mineral binders and obtained by this process. Also described herein is a hydrophobized material which includes mineral binders, including the reaction product of one or more mineral binder(s), the hydrophobizing agent and water.

13 Claims, 3 Drawing Sheets

(56) References Cited

FOREIGN PATENT DOCUMENTS

WO      2011121027 A1    10/2011
WO      2013044980 A1    4/2013

* cited by examiner

HYDROPHOBIZING AGENT FOR MINERAL MATERIALS

CROSS-REFERENCE TO RELATED APPLICATIONS

This application is a U.S. National Phase Application of International Patent Application No. PCT/EP2020/060478, filed Apr. 14, 2020, which claims priority to European Patent Application No. 19169214.4, filed Apr. 15, 2019, the entire contents of which are hereby incorporated by reference herein.

The invention relates to a hydrophobizing agent for mineral materials, comprising: a polyion complex (i) comprising at least one polycation (i.1) and at least one polyanion (i.2), where the molar ratio of polycation:polyanion in the polyion complex is ≥1; a silicone compound composition (ii); and a carrier composition (iii).

The invention further provides a process for producing a hydrophobizing agent comprising a polyion complex (i) comprising at least one polycation (i.1) and at least one polyanion (i.2), where the molar ratio of polycation:polyanion in the polyion complex is ≥1; a silicone compound composition (ii); and a carrier composition (iii), and also a hydrophobizing agent obtained or obtainable by this process. The invention further provides for the use of the hydrophobizing agent for the hydrophobizing of mineral binders and/or of compositions which contain mineral binders and/or of materials which comprise mineral binders, and also a binder composition comprising one or more mineral binder(s) and a corresponding hydrophobizing agent. The invention further provides a process for hydrophobizing materials which comprise mineral binders and a hydrophobized material comprising mineral binders obtained or obtainable by this process. The invention further provides a hydrophobized material which comprises mineral binders, comprising the reaction product of one or more mineral binder(s), the hydrophobizing agent and water.

Materials which comprise mineral binders, for example concretes, take up some amount of water, depending on their porosity, on contact with water. Materials which can penetrate with the water into the concrete are one of the main causes of damage to building constructions, for example cracks, frost damage, salt efflorescences, chloride-induced reinforcement corrosion or concrete corrosion in general. In the alkali-silica reaction (ASR), alkali-sensitive $SiO_2$ constituents of the rock particles react with the alkali metal ions and hydroxide ions ($K^+$, $Na^+$ and $OH^-$) of the pore solution in the concrete to form an alkali-silica gel which has a tendency to absorb water. Under unfavorable conditions, for example continual or intermittent contact with water, the volume of the alkali-silica gel increases over time to such an extent that local swelling pressures occur and damage the concrete microstructure and can externally lead to crack formation and spalling. In order to at least reduce such damage, various products based on silanes/siloxanes which act by hydrophobizing impregnation are known (ACI Materials Journal, 115, 5, 685-694 (2018)). Here, mineral substrates which have pores or capillaries are charged such that capillary sucking-in of water is prevented or at least reduced so as to offer protection against moisture (pore size range from 0.1 µm to 1 mm in diameter). However, the effectiveness of the silane-based systems known hitherto is capable of improvement, and there accordingly continues to be a need for further hydrophobizing agents.

The formation of polyion complexes as floc-like and water-insoluble structures has been known for a long time. Thus, the polyammonium salt of polyacrylic acid precipitates as floc-like precipitate from aqueous solution on combining equivalent amounts of sodium polyacrylides and a high molecular weight poly base, a polyammonium bromide composed of dimethylaminotrimethylene bromide. However, the salt formed is soluble neither in dilute hydrochloric acid nor in sodium hydroxide solution (Ber. dtsch. chem. Ges. 70, 887 (1937)).

Such complexes can also be obtained when, in the course of a flocculation reaction, the aqueous solutions of polyanions such as polygalacturonic acid (pectin) and polycations such as polyethylenimine, each having a linear molecular structure, are reacted with one another (Helv. Chim. Acta 36, 1671-1680 (1953)).

It is also known from "Encyclopedia of Polymer Science and Technology", Volume 10, pp. 765-780, (1969)—John Wiley & Sons Inc., that polyion complexes are formed in a rapid reaction on combining aqueous solutions of high molecular weight electrolytes having oppositely charged charge carriers, for example polyvinyltrimethylbenzylammonium chloride and sodium polystyrenesulfonate. The compounds formed under such reaction conditions are water-insoluble gels which display a certain plasticity in aqueous medium. However, they are brittle and crumbly in the dry state.

Fibrous, water-insoluble polyion complexes are, according to DE 23 33 207 C3 (1972), formed by reaction of a <10% strength aqueous solution of a polycation, e.g. poly-N,N,N',N'-tetramethylethylene-p-xylylenediammonium dichloride, with a polycarboxylic acid, e.g. polymethacrylic acid. After the polyion complex solution has been allowed to stand for two days, a pulverulent precipitate is firstly formed and this coagulates after a further three days and forms a water-insoluble, fibrous network.

DE 699 20 391 T2 (2006) discloses the synthesis of an ion complex which is used as biomedical coating material. The ion complex is obtainable in aqueous-ethanolic solution by free-radical copolymerization of the monomers diacetoneacrylamide, polyethylene glycol monomethacrylate, 3-trimethylammoniopropylacrylamide chloride and sodium heparin. However, the ion complex was insoluble in water and ethanol.

Silicon-organic compounds are in general most frequently used for the bulk hydrophobizing of mineral raw materials for the building materials industry. In addition, fatty acids and metal salts thereof and also epoxide-containing but also polyurethane-containing polymers or oligomeric compounds thereof are also used.

The wide field of silicon-organic compounds as hydrophobizing agents for mineral admixtures in the building industry utilizes the group of alkylsilanes and dialkylsilanes, modified alkylsilanes, which mainly contain amino- or carboxyl-containing alkylsilanes, condensed alkylsilanes, oligomerized silanes, known as siloxanes, and also silicone compounds for producing such derivatives. However, the focus is on the alkylsilanes or modified alkylsilanes and mixtures thereof.

The main problem associated with these compounds and mixtures is the addition of these into the various mineral mixtures which contain inorganic binders. The binders are hydrophilic and the hydrophobizing agents have the opposite effect (hydrophobic properties). Bulk hydrophobizing pulverulent additives either have to be mixed in the dry state into the mineral building material mixtures; the mixing operation requires an additional input of energy since the mixing power has to be increased due to the different particle sizes and particle ratios in the mineral building material mixtures; in aqueous systems, they cannot be incorporated since they are not uniformly distributed. This also applies in the production of mortar and concrete. On mixing with water, mortar and concrete are initially present as water-containing suspension in which a uniform distribution of the hydrophobizing agents cannot be ensured owing to the abovementioned properties.

If these pulverulent additives are to be incorporated into aqueous binder mixtures, the hydrophobized powder particles can be encapsulated in a water-soluble polymer so that these particles can be worked into aqueous systems.

In general, emulsions or liquid mixtures are increasingly added as bulk hydrophobizing agents to the aqueous mineral building material mixtures whose property profile is greatly altered by the addition since they are diluted in this aqueous system and are usually made unstable in the mixtures by the dilutions, so that there is often no good homogeneous distribution in the final mixture; the "homogenization" of the bulk hydrophobizing agent is the weak point in all published patents.

Taking into account these main points of view, bulk hydrophobizing agents are described in the most important patent documents which have more or less attempted to successfully solve the abovementioned problems but have not achieved a lasting effect.

DOW Corning Ltd. describes, in EP 0796 826 A1 (1996), a bulk hydrophobizing agent which is used primarily for hydrophobizing gypsum and is composed of alkylsilanes of the general formula $(RO)_3Si\ R$; $(RO)_2\ Si\ RR'$ or amino-functionalized silanes of the general formula $(RO)_3Si\ R'$; $(RO)_2\ Si\ RR'$ mixed with condensates or oligomers thereof. These mixtures are made water-soluble and can be added to the mineral building material mixtures. Nothing is said about the behavior of these bulk hydrophobizing agents in the mineral building material mixtures.

DEGUSSA-Hüls AG reports, in DE 197 47 794 A1 (1997), a bulk hydrophobizing agent which is utilized for producing a homogeneously hydrophobized concrete. A hydrolyzable organosilicon compound in an emulsion is used for this purpose. The emulsion is produced with the aid of an anionic or nonionic surfactant which is likewise made up of organosilicon compounds. The use concentration of the emulsion is from 0.1 to 10% by weight, based on the concrete mixture.

In their patent document EP 1 289 905 B1 (2001), Baeuml and Martinola describe a cement-bonded material which has been provided with a bulk hydrophobizing agent consisting of stearates, siliconates, silanes or siloxanes. The bulk hydrophobizing agent described was used in a concentration of from 0.5 to 20% by weight, based on the mineral binder used. It is emphasized that a "high-performance plasticizer" is additionally introduced into the mixture of the cement-bonded material.

Wacker-Chemie GmbH reports, in DE 102 20 659 A1 (2002), the treatment of gypsum with H-siloxanes and starch ethers. It comprises organosiloxane containing Si-bonded hydrogen atoms (H-siloxanes) and starch ethers as bulk hydrophobizing agent. The starch ether reinforces the water-repellent effect of the H-siloxanes on the gypsum.

Construction Research & Technology GmbH describes, in DE 10 2006 046 368 A1 (2006), a functionalized polyurethane resin (fluoro-modified polyurethane) for coating mineral and nonmineral surfaces (only in very specific applications).

Dow Corning Corp. describes, in WO 2007/009935 A2, the bulk hydrophobizing of fillers for the building industry, for example gypsum, minerals, silica gel, etc., with hydrolyzed polysiloxanes derived from hydrolyzable silanes and mixtures thereof in the presence of acid catalysts. These hydrolysates can be converted into appropriate emulsions in order to therefore produce hydrophobic products.

Evonik Degussa GmbH describes, in DE 10 2008 041 920 A1, new catalysts for crosslinking functional silanes or functional siloxanes. Organic acids having from 4 to 46 carbon atoms: carboxylic acids, carboxysilanes, esters and anhydrides are used as catalysts; the crosslinked functional silanes and siloxanes are used for the in-depth impregnation of concrete, for porous building materials. In a particular case, they are organofunctional tricarboxysilanes produced from one mol of silane and 3 mol of organic carboxylic acids, with preference being given to aminocarboxysilanes.

Evonik Goldschmidt GmbH describes, in DE 10 2009 022 628 A1, hydroxyl-containing silyl polyethers as bulk hydrophobizing agents for modifying particle surfaces. These are produced, on the one hand, by alkoxylation of silicone-polyether copolymers or polysiloxanes using epoxy-functional alkoxysilanes over double metal cyanide catalysts. On the other hand, they are produced by hydrosilylating linkage of polyethers bearing unsaturated alkoxysilyl groups, which have previously been obtained by alkoxylation of the corresponding unsaturated starting compounds using epoxy-functional alkoxysilanes over DMC catalysts.

In DE 10 2009 028 640 A1, Evonik Goldschmidt GmbH reports a curable composition which comprises silylated polymers containing urethane groups and is used for hydrophobizing sealants and adhesives. Such compositions are also used for the hydrophobic modification of binders and for making filler particles hydrophobic. These silylated polymers which are used contain a plurality of isocyanate groups in addition to alkoxysilyl groups.

Evonik Degussa GmbH reports, in DE 10 2010 003 868 A1, a bulk hydrophobizing agent predominantly for mineral building materials, mainly nonsiliceous building materials such as chalk, limestone, marble, dolomite, magnesite, etc. Here, it is generally porous materials which are made hydrophobic. The bulk hydrophobizing agent which is used here consists of various alkylsilanes, ester silanes and alkanolamines or diamines having various structures which are treated so that mixed hydrolysis and condensation products thereof are formed. These mixtures are emulsifiable in aqueous systems. Alkylsilanes (alkyltrimethoxysilanes and alkyltriethoxysilanes) are utilized for this purpose.

In DE 10 2010 003 870 A1, Evonik Degussa GmbH describes a bulk hydrophobizing agent for mainly nonsiliceous building materials, e.g. gypsum. Aqueous alkyl- and amino-modified silicon-containing cocondensates are used for bulk hydrophobizing. Cocondensates are produced, for example, from isobutyltrimethoxysilane and aminopropyl-trialkoxysilane.

Evonik Goldschmidt GmbH describes, in DE 10 2010 038 768 A1, modified alkoxylation products having at least one nonterminal alkoxysilyl group having increased storage stability and increased rotatability of the polymers produced. These are epoxy-functional alkoxysilanes and glycidyl-functional alkoxysilanes. These compounds are used as bulk hydrophobizing agents in the form of aqueous emulsions and dispersions for mineral building materials.

In DE 10 2010 038 774 A1 and EP 2415 797 A1 (2011), Evonik Goldschmidt GmbH likewise described modified alkoxylation products which have at least one nonterminal alkoxysilyl group and have increased storage stability and increased rotatability of the polymers produced for the application. The alkoxysilane compounds used for this purpose are, for example, 3-glycidylpropyltrimethoxysilanes or 3-glycidylpropyltriethoxysilanes from which nanocomposites are then produced in a modified sol-gel process and which are used as bulk hydrophobizing agents in composite materials. The alkoxylation products have trialkylsilyl end blocks, a urethane end block or an ester end block.

In WO 2011/121 027 A1, Evonik Degussa GmbH and Akzo Nobel Chemicals International B.V. report a bulk hydrophobizing agent for mineral binders. Fluoroorganyl-substituted Si compounds are applied to mineral powder surfaces. This treated powder is encapsulated by means of a water-soluble polymer, with the amount of the Si compounds applied to the powder being from 0.001 to 8% by weight. The fluoroorganyl-substituted Si compounds can be described as fluoroorganyl-substituted silanes, siloxanes or silicones. These Si compounds are used alone or as mixtures. Biopolymers such as proteins, polysaccharides, dextrins, gelatins or soy proteins, etc. are used for encapsulation.

In WO 2013/044980 A1, fluoroalkyl-substituted silanes or silicone compounds are utilized by Akzo Nobel Chemical International B.V. for making mineral powders hydrophobic; these powders are then used for the bulk hydrophobizing of mineral building material mixtures. The substituted silanes contain monofluorinated, oligofluorinated or perfluorinated groups.

In summary, it can be said that the polyion complexes known from the prior art are unsuitable as hydrophobizing coating auxiliaries because of their insolubility in water or organic solvents. Even when aqueous-organic solvent systems are said to bring about dissolution of such complexes, this solution to the problem is at the expense of the subsequent and necessary disposal of the organic solvent. Under industrial conditions, this is a costly measure which also makes it necessary to work under explosion protection conditions—a further cost factor.

It is therefore an object of the present invention to provide further hydrophobizing agents which are effective and inexpensive and do not have the abovementioned disadvantages.

The object is achieved by a hydrophobizing agent for mineral materials, comprising:
  i) a polyion complex comprising at least one polycation (i.1) and at least one polyanion (i.2), where the molar ratio of polycation:polyanion in the polyion complex is $\geq 1$;
  ii) a silicone compound composition.

The quality of hydrophobizing of mineral materials can, inter alia, be measured by the uptake of water by capillary action. Mineral materials have capillaries which act like a sponge and transport the moisture. The capillary water uptake or the capillary suction capability is the main transport mechanism for moisture. Hydrophobizing agents are intended to alter mineral substrates so that capillary sucking-in of water is prevented or at least reduced in order to offer protection against moisture. When the hydrophobizing agents of the invention are employed, it has surprisingly been able to be shown that the capillary water uptake was significantly lower compared to an appropriate reference for which no hydrophobizing agent was employed.

A further indicator of hydrophobizing is the contact angle. The contact angle (synonymously referred to as edge angle or wetting angle) is the angle formed by a liquid droplet, for example a water droplet, to the surface of a solid when placed on this surface. For a surface to be said to be hydrophobic or hydrophobized or an agent to be said to have a hydrophobizing effect, the contact angle or the corresponding average has to be at least 90°. On examination of specimens which had been hydrophobized according to the invention, it was surprisingly able to be shown that all specimens displayed a contact angle (average) on the surface significantly above 90°, preferably $\geq 95°$, more preferably $\geq 100°$, and could thus be said to be hydrophobic or hydrophobized.

In an embodiment of the hydrophobizing agent, the polyion complex (i) comprises from 1 to 4 mol of polycations (i.1) per 1 mol of polyanions (i.2).

Polycations (i.1)

The polycations (i.1) of the polyion complex (i) are preferably cationic polymers or copolymers, preferably cationic polymers or copolymers which have at least one quaternary ammonium cation and which are more preferably selected from the group consisting of
  a) poly-N,N,N-tri-$C_1$-$C_5$-alkylammonioalkyl acrylate, where the poly-N,N,N-tri-$C_1$-$C_5$-alkylammonioalkyl acrylate is preferably selected from the group consisting of poly-N,N,N-[3-(trimethylammonio)ethyl]acrylate, poly-N,N,N-[3-(trimethylammonio)propyl] acrylate, poly-N,N,N-[3-(trimethylammonio)butyl]acrylate, poly-N,N,N-[3-(methyldiethylammonio)propyl]acrylate and mixtures of two or more of these poly-N,N,N-tri-$C_1$-$C_5$-alkylammonioalkyl acrylates;
  b) poly-N,N,N-tri-$C_1$-$C_5$-alkylammonioalkyl methacrylate, where the poly-N,N,N-tri-$C_1$-$C_5$-alkylammonioalkyl methacrylate is preferably selected from the group consisting of poly-N,N,N-[3-(trimethylammonio)ethyl]methacrylate, poly-N,N,N-[3-(trimethylammonio)propyl]methacrylate, poly-N,N,N-[3-(trimethylammonio)butyl]methacrylate, poly-N,N,N-[3-(methyldiethylammonio)propyl]methacrylate and mixtures of two or more of these poly-N,N,N-tri-$C_1$-$C_5$-alkylammonioalkyl methacrylates;
  c) poly-N,N,N-tri-$C_1$-$C_5$-alkylammonioalkylacrylamide, where the poly-N,N,N-tri-$C_1$-$C_5$-alkylammonioalkylacrylamide is preferably selected from the group consisting of poly-N,N,N-[3-(trimethylammonio)ethyl]acrylamide, poly-N,N,N-[3-(trimethylammonio)propyl]acrylamide, Poly-N,N,N-[3-(trimethylammonio)butyl]acrylamide, poly-N,N,N-[3-(methyldiethylammonio)propyl]acrylamide and mixtures of two or more of these poly-N,N,N-tri-$C_1$-$C_5$-alkylammonioalkylacrylamides;
  d) poly-N,N,N-tri-$C_1$-$C_5$-alkylammonioalkylmethacrylamide, where the poly-N,N,N-tri-$C_1$-$C_5$-alkylammonioalkylmethacrylamide is preferably selected from the group consisting of poly-N,N,N-[3-(trimethylammonio)ethyl]methacrylamide, poly-N,N,N-[3-(trimethylammonio)propyl]methacrylamide, poly-N,N,N-[3-(trimethylammonio)butyl]methacrylamide, poly-N,N,N-[3-(methyldiethylammonio)propyl]methacrylamide and mixtures of two or more of these poly-N,N,N-tri-$C_1$-$C_5$-alkylammonioalkylmethacrylamides;
  e) poly-N-3-methyl-1-vinylimidazolium;
  f) quaternized poly[bis(2-chloroethyl) ether-alt-1,3-bis(3-dimethylaminopropyl)urea];
  g) poly(dimethylamine-co-epichlorohydrin-co-ethylenediamine);
  h) polydimethyldiallylammonium;
  i) poly(dimethyldiallylammonium-co-methyldiallylamine hydrochloride); and
  j) poly-N,N—$R_1$,$R_2$-disubstituted-3,4-dimethylenepyrrolidinium, where $R_1$ and $R_2$ are selected independently from the group consisting of a hydrogen atom, a $C_1$-$C_{18}$-alkyl radical and a benzyl radical;
  where the positive charge on the nitrogen atom of the quaternary ammonium cation is balanced by a singly charged anion, preferably an anion selected from the group consisting of halide anion, in particular chloride anion, methosulfate anion, ethosulfate anion and mixtures of two or more of these anions.

In an embodiment of the hydrophobizing agent, the polycations (i.1) of the polyion complex (i) are cationic polymers or copolymers which have at least one quaternary ammonium cation and are selected from the group consisting of a.1) poly-N,N,N-tri-$C_1$-$C_5$-alkylammonioalkyl acrylate chloride or methosulfate, preferably selected from the group consisting of
poly-N,N,N-[3-(trimethylammonio)ethyl]acrylate chloride,
poly-N,N,N-[3-(trimethylammonio)propyl]acrylate chloride,
poly-N,N,N-[3-(trimethylammonio)butyl]acrylate chloride,
poly-N,N,N-[3-(methyldiethylammonio)propyl]acrylate methosulfate, and mixtures of two or more of these poly-N,N,N-tri-$C_1$-$C_5$-alkylammonioalkyl acrylate chlorides or methosulfates;

b.1) poly-N,N,N-tri-$C_1$-$C_5$-alkylammonioalkyl methacrylate chloride or methosulfate, preferably selected from the group consisting of
poly-N,N,N-[3-(trimethylammonio)ethyl]methacrylate chloride,
poly-N,N,N-[3-(trimethylammonio)propyl]methacrylate chloride,
poly-N,N,N-[3-(trimethylammonio)butyl]methacrylate chloride,
poly-N,N,N-[3-(methyldiethylammonio)propyl]methacrylate methosulfate, and mixtures of two or more of these poly-N,N,N-tri-$C_1$-$C_5$-alkylammonioalkyl methacrylate chlorides or methosulfates;

c.1) poly-N,N,N-tri-$C_1$-$C_5$-alkylammonioalkylacrylamide chloride or methosulfate, preferably selected from the group consisting of
poly-N,N,N-[3-(trimethylammonio)ethyl]acrylamide chloride,
poly-N,N,N-[3-(trimethylammonio)propyl]acrylamide chloride,
poly-N,N,N-[3-(trimethylammonio)butyl]acrylamide chloride,
poly-N,N,N-[3-(methyldiethylammonio)propyl]acrylamide chloride, and mixtures of two or more of these poly-N,N,N-tri-$C_1$-$C_5$-alkylammonioalkylacrylamide chlorides or methosulfates;

d.1) poly-N,N,N-tri-$C_1$-$C_5$-alkylammonioalkylmethacrylamide chloride or methosulfate, preferably selected from the group consisting of
poly-N,N,N-[3-(trimethylammonio)ethyl]methacrylamide chloride,
poly-N,N,N-[3-(trimethylammonio)propyl]methacrylamide chloride,
poly-N,N,N-[3-(trimethylammonio)butyl]methacrylamide chloride,
poly-N,N,N-[3-(methyldiethylammonio)propyl]methacrylamide chloride, and mixtures of two or more of these poly-N,N,N-tri-$C_1$-$C_5$-alkylammonioalkylmethacrylamide chlorides or methosulfates;

e.1) poly-N-3-methyl-1-vinylimidazolium chloride;

f.1) poly[bis(2-chloroethyl) ether-alt-1,3-bis(3-dimethylaminopropyl)urea], quaternized;

g.1) poly(dimethylamine-co-epichlorohydrin-co-ethylenediamine);

h.1) polydimethyldiallylammonium chloride;

i.1) poly(dimethyldiallylammonium chloride-co-methyldiallylamine hydrochloride); and j.1) poly-N,N—$R_1$,$R_2$-disubstituted-3,4-dimethylenepyrrolidinium chloride, where $R_1$ and $R_2$ are selected independently from the group consisting of a hydrogen atom, a Ci-Cia-alkyl radical and a benzyl radical.

In an embodiment of the hydrophobizing agent, the polycations (i.1) of the polyion complex (i) are poly-N,N-disubstituted-3,4-dimethylenepyrrolidinium salts, preferably chloride salts, of the general formula (I):

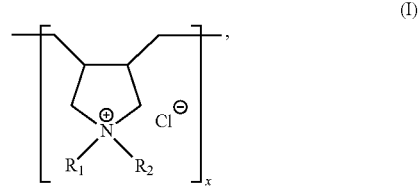

where
$R_1$ and $R_2$ are selected independently from the group consisting of a hydrogen atom, a $C_1$-$C_{18}$-alkyl radical and a benzyl radical;
x is an integer (degree of polymerization).

Polyanions (i.2)

In an embodiment of the hydrophobizing agent, the polyanions (i.2) of the polyion complex (i) are copolymeric monobasic to polybasic polyanion esters (polycarboxylate ether, PCE) based on monounsaturated $C_3$-$C_{10}$-monocarboxylic, dicarboxylic and tricarboxylic acids, preferably selected from the group consisting of methacrylic acid, maleic acid, methylenesuccinic acid, aconitic acid and mixtures of two or more of these acids which are present in the form of their alkali metal salts or ammonium salts, preferably as lithium, sodium, potassium or ammonium salts, more preferably as sodium salts.

The polyanions (i.2) of the polyion complex (i) are preferably selected from the group of polycarboxylate ethers (PCE), preferably selected from the group consisting of poly(methacrylic acid-co-polyethylene glycol monomethyl ether methacrylate), poly(acrylic acid-co-polyethylene glycol monomethyl ether methacrylate), poly(methacrylic acid-co-polyethylene glycol monomethyl ether acrylate), poly (maleic acid-co-polyethylene glycol monomethyl ether methacrylate), poly(methacrylic acid-co-polyethylene glycol monomethyl ether methacrylamide), poly(maleic acid-co-polyethylene glycol monomethyl ether methacrylate), poly(itaconic acid-co-polyethylene glycol monomethyl ether methacrylate), poly(aconitic acid-co-polyethylene glycol monomethyl ether methacrylate), poly(maleic acid-co-polyethylene glycol monomethyl ether methacrylamide), poly(maleic acid-co-polyethylene glycol methylamide methacrylate), poly(methacrylic acid-co-polyethylene glycol monomethyl ether monoester of maleic acid), poly (acrylic acid-co-polyethylene glycol monomethyl ether monoester of maleic acid), poly(methacrylic acid-co-polyethylene glycol monomethyl ether monoester of itaconic acid), poly(acrylic acid-co-polyethylene glycol monomethyl ether monoester of itaconic acid), poly(methacrylic acid-co-polyethylene glycol monomethyl ether monoester of aconitic acid), poly(acrylic acid-co-polyethylene glycol monomethyl ether monoester of aconitic acid), and mixtures of two or more of these PCEs, where the polyethylene glycol (or methyl ether) radical in the anionic polymers listed above is —[$CH_2$—$CH_2$—O]$_a$—H or —[$CH_2$—$CH_2$—O]$_a$—$CH_3$, where a represents the degree of ethoxylation (number of monomeric ethylene oxide repeating units) and is an integer in the range from 1 to 100; where the negative charge is in each case balanced by one or more singly charged cation(s), preferably a cation selected from the group of alkali metal cations or ammonium cation and mixtures of two or more of these cations, preferably by sodium cation(s).

Molar Ratio of Polycations (i.1):Polyanions (i.2) of >1

In an embodiment of the hydrophobizing agent, the polyion complex (i) comprises a molar ratio of polycations (i.1):polyanions (i.2) of >1, preferably in the range from 2:1 to 4:1.

In a preferred embodiment of the hydrophobizing agent, the polyion complex (i) has a molar ratio of polycations (i.1):polyanions (i.2) in the range from 2:1 to 4:1; where the polycations (i.1) are preferably poly-N,N-disubstituted-3,4-dimethylenepyrrolidinium salts and the polyanions (i.2) are polyanion esters based on monounsaturated $C_3$-$C_{10}$-monocarboxylic, dicarboxylic and tricarboxylic acids of the general formula (Ia),

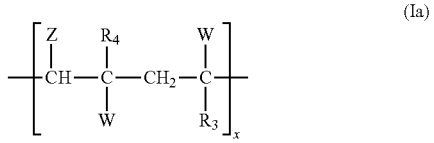

(Ia)

where
R$_3$ is a hydrogen atom or a $C_1$-$C_4$-alkyl radical, preferably a methyl group,
R$_4$ is selected from the group consisting of a hydrogen atom, a $C_1$-$C_4$-alkyl radical, preferably methyl, and a —CH$_2$—Z group, where
Z may in each case be a hydrogen atom or an N,N-disubstituted-3,4-dimethylenepyrrolidinium radical in which the positive charge on the nitrogen atom of the quaternary pyrrolidinium cation is balanced by a carboxylate anion radical, where the pyrrolidinium salt radical has the general formula (Ia.1),

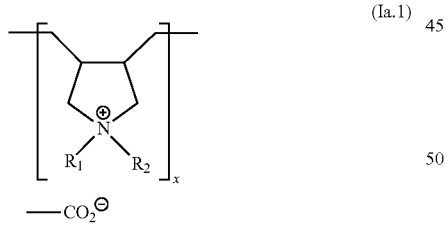

(Ia.1)

where
R$_1$ and R$_2$ are selected independently from the group consisting of a hydrogen atom, a $C_1$-$C_{18}$-alkyl radical and a benzyl radical;
x is the degree of polymerization (number of monomeric repeating units in the polymer);
W is Z or a double N,N-disubstituted-3,4-dimethylenepyrrolidinium radical in which the positive charges on the nitrogen atoms of the quaternary pyrrolidinium cations are balanced by a chloride anion and a carboxylate anion radical, where the bis-N,N-disubstituted-3,4-dimethylenepyrrolidinium salt radical has the general formula (Ia.2),

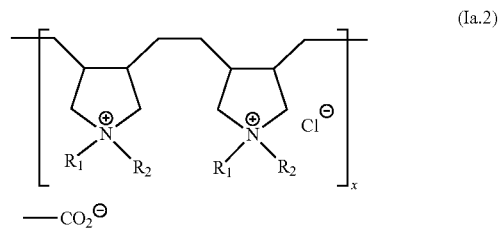

(Ia.2)

having the meanings indicated above for R$_1$, R$_2$ and x for the general formula (Ia.1), or a polyethylene glycol monomethyl ether ester radical of the general formula (Ia.3),

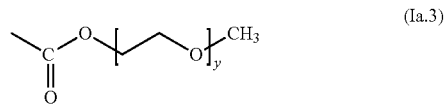

(Ia.3)

where
y is an integer from 1 to 100 (degree of ethoxylation, number of monomeric ethylene oxide repeating units).

In Z or W, the —CO$_2^-$ group shown in each case in the formulae (Ia.1) or (Ia.2) is covalently bound to the carbon atom of the —CH— group in the general formula (Ia) or to the carbon atom of the —CR$_3$— group in the general formula (Ia).

In a further preferred embodiment of the hydrophobizing agent, the polyion complex (i) has the general formula (Ib),

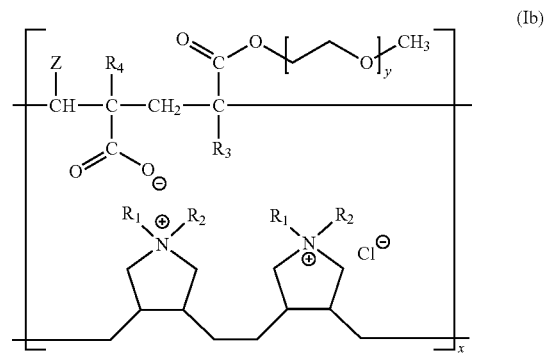

(Ib)

having the meanings indicated above for R$_1$, R$_2$, R$_3$, R$_4$, Z, x and y for the general formulae (Ia), (Ia.1) and (Ia.3).

Molar Ratio of Polycations (i.1):Polyanions (i.2) of 1

In an embodiment of the hydrophobizing agent, the polyion complex (i) has a molar ratio of polycations (i.1): polyanions (i.2) of 1.

Here, the polyion complex (i) preferably comprises a copolymeric compound composed of preferably alternately arranged, molar amounts of polycations, preferably poly-N,N-disubstituted-3,4-dimethylenepyrrolidinium salts, and molar amounts of monocarboxylic esters, based on the monomeric repeating units.

In a preferred embodiment of the hydrophobizing agent, the polyion complex (i) comprises a copolymeric compound composed of alternately arranged, molar amounts of poly-N,N-disubstituted-3,4-dimethylenepyrrolidinium salts and molar amounts of monocarboxylic esters of the general formula (II),

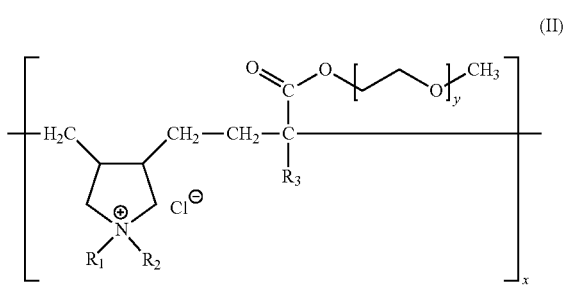

(II)

where
- $R_1$, $R_2$ are selected independently from the group consisting of a hydrogen atom, a $C_1$-$C_{18}$-alkyl radical and a benzyl radical;
- $R_3$ is a hydrogen atom or a $C_1$-$C_4$-alkyl radical, preferably a methyl group;
- y is an integer from 1 to 100 (degree of ethoxylation, number of monomeric ethylene oxide repeating units);
- x is the degree of polymerization (number of monomeric repeating units in the polymer).

Silicone Compound Composition (ii)

The hydrophobizing agent comprises a silicone compound composition (ii) which preferably comprises at least one silicone compound (ii.1) selected from the group consisting of monoorgano-$C_1$-$C_{20}$-trialkoxysilane, diorgano-$C_1$-$C_{20}$-dialkoxysilane, poly(organo-$C_1$-$C_{20}$-alkoxysiloxane) and mixtures of two or more of these silicone compounds.

The expression "organo" means a branched or unbranched or cyclic $C_1$-$C_{20}$-alkyl group or a $C_5$-$C_{10}$-aryl group.

The monoorgano-$C_1$-$C_{20}$-trialkoxysilane is preferably selected from the group consisting of methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, isobutyltrimethoxysilane, isobutyltriethoxysilane, pentyltriethoxysilane, cyclopentyltrimethoxysilane, octyltriethoxysilane, isooctyltriethoxysilane, n-decyltriethoxysilane, dodecyltriethoxysilane, hexadecyltriethoxysilane, octadecyltrimethoxysilane, octadecyltriethoxysilane, phenyltriethoxysilane and mixtures of two or more of these monoorgano-$C_1$-$C_{20}$-trialkoxysilanes. In a preferred embodiment of the hydrophobizing agent, the diorgano-$C_1$-$C_{20}$-dialkoxysilane is selected from the group consisting of dimethyldiethoxysilane, diethyldiethoxysilane, diisopropyldimethoxysilane, diisobutyldimethoxysilane, di-n-butyldimethoxysilane, dicyclopentyldimethoxysilane, di-n-octyldiethoxysilane, dodecylmethyldiethoxysilane, n-octadecylmethyldiethoxysilane, phenylmethyldiethoxysilane, diphenyldiethoxysilane and mixtures of two or more of these diorgano-$C_1$-$C_{20}$-dialkoxysilanes. The abovementioned poly(organo-$C_1$-$C_{20}$-alkoxysiloxane) is preferably an oligo(organo-$C_1$-$C_{20}$-0,6-1,4-alkoxysiloxane) ("oligo" means a structure having from 3 to 10 repeating units) and is preferably obtained or obtainable from one or more of the abovementioned monoorgano-$C_1$-$C_{20}$-trialkoxysilane(s), more preferably by heating the monoorgano-$C_1$-$C_{20}$-trialkoxysilane(s) to temperatures in the range from 50° to 130° C. in the presence of from 0.8 to 1.2 mol of water per mol of monoorgano-$C_1$-$C_{20}$-trialkoxysilane(s).

Oligo(organo-$C_1$-$C_{20}$-0,6-1,4-alkoxysiloxanes) are obtainable from monoorgano-$C_1$-$C_{20}$-trialkoxysilane(s) by condensing such compounds in the first reaction step comprising heating in the presence of small amounts of water and partial hydrolysis of the alkoxy groups, associated with elimination of alkanols, firstly to form "dimer siloxanes" and subsequently "trimer siloxanes" (see above—when the degree of condensation n is 0 or 1 in the general formula (III)). Subsequent similar reaction steps ultimately convert the "trimer siloxanes" via numerous reaction stages and intermediates into a mixture of differently structured oligo(organo-$C_1$-$C_{20}$-0,6-1,4-alkoxysiloxanes).

Depending on the way in which the process is carried out and the associated prerequisites, namely the amounts of water used for partial hydrolysis, the height of the reaction temperature and the duration of the reaction, fluctuating amounts of final condensation products are obtained. Thus, comparatively high temperatures and relatively long reaction times promote the formation of more highly condensed oligomers.

The oligo(organo-$C_1$-$C_{20}$-0,6-1,4-alkoxysiloxanes) obtained were analyzed by mass spectroscopy as a mixture made up of substances of 2 to 10 monoorgano-$C_1$-$C_{20}$-trialkoxysilanes. The chemical structures correspond to the general formulae (III) to (IX).

Oligo(organo-$C_1$-$C_{20}$-0,6-1,4-alkoxysiloxanes) (linearly condensed; proportion of all final condensation products: from 3 to 15% by weight) of the general formula (II),

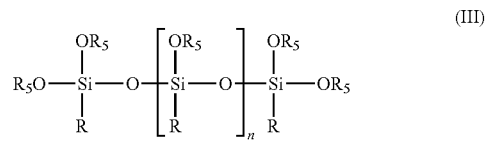

(III)

where
- R is a linear or branched $C_1$-$C_{20}$-alkyl radical,
- $R_5$ is a $C_1$-$C_5$-alkyl radical, preferably an ethyl radical,
- n is the degree of condensation (number of monomeric repeating units in the polymer) having integral values from 0 to 8.

Oligo(organo-$C_1$-$C_{20}$-0,6-1,4-alkoxysiloxanes) (monocyclically condensed, without (n=0) side chain or with a linear side chain; proportion of all final condensation products:
n=0 from 20 to 54% by weight or n=1 from 12 to 19% by weight) of the general formula (IV),

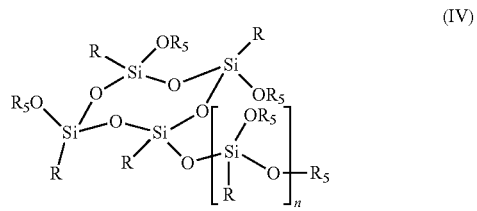

(IV)

where
- R and $R_5$ are as defined above,
- n is the integer 0 or 1.

Oligo(organo-$C_1$-$C_{20}$-0,6-1,4-alkoxysiloxanes) (bicyclically condensed; proportion of all final condensation products: from 3 to 21% by weight) of the general formula (V),

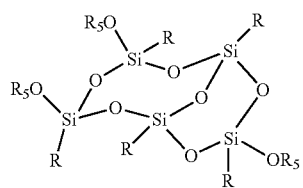
(V)

where
R and $R_5$ are as defined above.

Oligo(organo-$C_1$-$C_{20}$-0,6-1,4-alkoxysloxanes) (bicyclically condensed, with a linear side chain or two linear side chains; proportion of all final condensation products: from 8 to 23% by weight) of the general formula (VI),

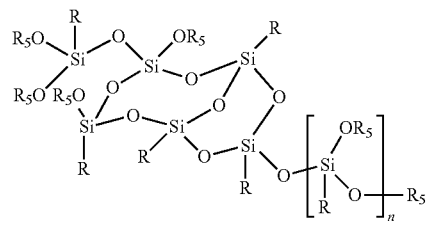
(VI)

where
R and $R_5$ are as defined above,
n is an integer from 0 to 3.

Oligo(organo-$C_1$-$C_{20}$-0,6-1,4-alkoxysiloxanes) (tricyclically condensed, without side chain (n=0) or with a linear side chain; proportion of all final condensation products:
from 1 to 3% by weight) of the general formula (VII),

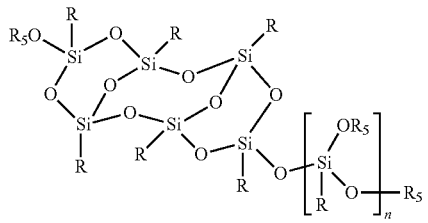
(VII)

where
R and $R_5$ are as defined above,
n is an integer from 0 to 3.

Oligo(organo-$C_1$-$C_{20}$-0,6-1,4-alkoxysiloxanes) (tricyclically condensed, with a cyclic side chain; proportion of all final condensation products: from 0 to 1% by weight) of the general formula (VIII),

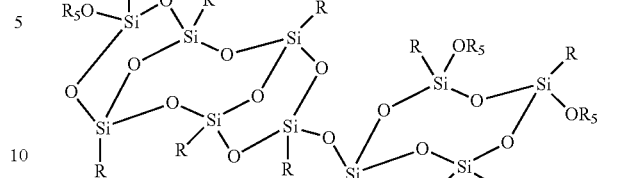
(VIII)

where
R and $R_5$ are as defined above.

Oligo(organo-$C_1$-$C_{20}$-0,6-1,4-alkoxysiloxanes) (tricyclically condensed and with α,ω-bridging of the outer rings, without side chain (n=0) or with a linear side chain at the bridge head; proportion of all final condensation products: from 0 to 6% by weight) of the general formula (IX),

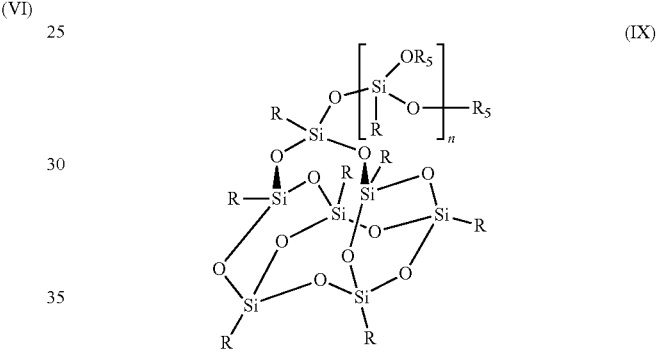
(IX)

where
R and $R_5$ are as defined above,
n is an integer from 0 to 3.

In an embodiment of the hydrophobizing agent, the weight ratio of polyion complex (i) to silicone compound composition (ii) is in the range from 1:7 to 1:17.

Carrier Composition (iii)

In a preferred embodiment, the hydrophobizing agent for mineral materials further comprises a carrier composition (iii), where the carrier composition comprises at least one carrier selected from the group consisting of amorphous silicon dioxide, amorphous agglomerated silicon dioxide, quartz powder, limestone powder, aluminum oxide, illite, iron oxide and mixtures of two or more of these carriers, preferably at least amorphous agglomerated silicon dioxide.

In a preferred embodiment, the hydrophobizing agent for mineral materials therefore comprises:
 i) a polyion complex comprising at least one polycation (i.1) and at least one polyanion (i.2), where the molar ratio of polycation:polyanion in the polyion complex is ≥1;
 ii) a silicone compound composition;
 iii) a carrier composition.

In an embodiment of the hydrophobizing agent, this consists of at least 90% by weight of polyion complex (i), silicone compound composition (ii), carrier composition (iii) and not more than 10% by weight of water, based on the total weight of the hydrophobizing agent.

In an embodiment of the hydrophobizing agent, the weight ratio of polyion complex (i) to silicone compound composition (ii) is in the range from 2:22 to 6:34.

In an embodiment of the hydrophobizing agent, the hydrophobizing agent further comprises:
- (iv) optionally a surfactant composition comprising one or more surfactants, where the surfactant(s) is/are selected from the group consisting of polyethylene glycol caproate, polyethylene glycol caprylate, polyethylene glycol caprinate, polyethylene glycol monomethyl ether ester of undecylenoic acid, polyethylene glycol undecylenoate, polyethylene glycol laurate, polyethylene glycol myristate, polyethylene glycol palmitate, polyethylene glycol stearate, polyethylene glycol monomethyl ether ester of oleic acid, polyethylene glycol ricinoleate, polyethylene glycol elaidate, polyethylene glycol linoleate, polyethylene glycol linolenate, polyethylene glycol erucate, palmitic/stearic acid diethanol-block-(polypropylene glycol) amide and mixtures of two or more of these surfactants;
- (v) optionally a UV dye composition comprising one or more UV dyes, where the UV dye(s) is/are selected from the group consisting of 2,2'-(2,5-thiophenediyl) bis(5-tert-butyl-1,3-benzoxazole), (disodium 4,4'-bis (2-sulfostyryl)biphenyl), fluorescein, 2,7-dichlorofluorescein, rhodamine B and mixtures of two or more of these dyes.

In an embodiment of the hydrophobizing agent, this consists of at least 90% by weight of polyion complex (i), silicone compound composition (ii), carrier composition (iii) and not more than 10% by weight of water and also (iv) optionally surfactant composition and (v) optionally UV dye composition, based on the total weight of the hydrophobizing agent.

The hydrophobizing agent, preferably consisting of at least 90% by weight of polyion complex (i), silicone compound composition (ii), and carrier composition (iii), is hydrophilic or displays hydrophilic behavior on the surface, which can, for example, be demonstrated by the wettability of the hydrophobizing agent with water. To test the hydrophilic surface behavior, the hydrophobizing agent can, for example, be admixed with water in a suitable vessel (for example glass beaker) and mixed with the water. After being allowed to stand for at least one minute, the wetted and individualized particles of the hydrophobizing agent all settle on the bottom of the vessel due to the density difference between the particles and the water. Floating, unwetted hydrophobic particles of hydrophobizing agent or silane/siloxane droplets are not observed on the surface of the water.

Process for Producing a Hydrophobizing Agent

The invention further provides a process for producing a hydrophobizing agent, comprising
- i) a polyion complex comprising at least one polycation (i.1) and at least one polyanion (i.2), where the molar ratio of polycation:polyanion in the polyion complex is ≥1;
- ii) a silicone compound composition;
- iii) a carrier composition;

wherein the process comprises the steps:
- a) Providing a polyion complex (i) in aqueous solution;
- b) Providing a carrier composition (iii);
- c) Mixing of the aqueous solution of the polyion complex (i) as per (a) with carrier composition (iii) as per (b), preferably with mechanical mixing (preferably stirring/kneading), to give a first mixture;
- d) Adding a silicone compound composition (ii) which optionally contains a surfactant composition and/or a UV dye composition to the first mixture obtained in (c), preferably with mechanical mixing (preferably stirring/kneading), to give a coated pulverulent carrier composition of the hydrophobizing agent.

The coated pulverulent carrier composition of the hydrophobizing agent preferably has a water content of from 4 to 8% by weight.

The invention further provides a hydrophobizing agent obtained or obtainable by the above-described process.

The invention likewise provides for the use of a hydrophobizing agent according to any of the above-described embodiments or a hydrophobizing agent obtained or obtainable by the above-described process for the hydrophobizing of mineral binders and/or of compositions which contain mineral binders (binder composition) and/or of materials which comprise mineral binders.

The expression "mineral binder" refers to, in particular, inorganic mineral binders and encompasses cement, slaked lime ($Ca(OH)_2$), clay, gypsum and mixtures of two or more of these mineral binders, preferably mineral binders selected from the group consisting of cement, slaked lime, gypsum and mixtures of two or more of these mineral binders. In a preferred embodiment, the mineral binder comprises at least cement; in another preferred embodiment, the mineral binder comprises at least gypsum. "Binder composition" refers to a composition which comprises one or more mineral binder(s). "Material(s) which comprise/comprises mineral binders" encompasses all materials which are obtained from a binder composition at least with addition of water.

The invention further provides a binder composition comprising one or more mineral binder(s), preferably selected from the group consisting of cement, slaked lime ($Ca(OH)_2$) and gypsum, and a hydrophobizing agent according to any of the above-described embodiments.

Process for Hydrophobizing Materials

The invention likewise provides a process for hydrophobizing materials which comprise mineral binders, comprising the steps A) Providing a binder composition comprising one or more mineral binder(s), preferably selected from the group consisting of cement, slaked lime and gypsum;

B) Providing a hydrophobizing agent comprising a polyion complex (i) comprising at least one polycation (i.1) and at least one polyanion (i.2), where the molar ratio of polycation:polyanion in the polyion complex is ≥1; a silicone compound composition (ii); a carrier composition (iii);

C) Mixing of the binder composition as per (A) and the hydrophobizing agent as per (B) to give a mixture of binder composition and hydrophobizing agent;

D) Adding water (w) to the mixture of binder composition (b) and hydrophobizing agent, preferably in a w/b ratio in the range from 0.1 to 1.0, more preferably in a w/b ratio in the range from 0.2 to 0.6, more preferably in a w/b ratio in the range from 0.3 to 0.5, as obtained in (C) and mixing of the components;

to give a hydrophobized material comprising mineral binders.

"Hydrophobized material comprising mineral binders" means the reaction product of the reaction of binder or binder composition, water and hydrophobizing agent. As indicated above, "material(s) which comprises/comprise mineral binders" means materials which have been obtained from a binder composition at least with addition of water, for example materials such as concrete or mortar. The addition of (organic) admixtures and/or additives and/or rock particle fractions is likewise encompassed.

(Concrete) admixtures are substances which are dissolved or slurried, preferably in water, and are added to the material, for example the concrete, in order to alter the properties of the material, for example the fresh or set concrete, e.g. processability, setting behavior, curing or durability, by physical and/or chemical action. Additives, for example concrete additives, are pulverulent or liquid additions which influence particular properties of the material, for example the concrete. They may be added to the material/concrete only when they do not adversely affect the curing of the cement, the strength and the resistance of the material/concrete and the protection against corrosion of the reinforcement. In contrast to (concrete) admixtures, they have to be taken into account as volume constituents in establishing the formulation of the concrete. (Concrete) additives are preferably selected from the group consisting of fine mineral material, organic material (for example synthetic resin), color pigment, fibers and mixtures of two or more of these additives. Fine mineral materials are preferably ground rock, pozzolanic materials (preferably selected from the group consisting of fly ash, tuff, trass, silica dust, calcined clays and mixtures of two or more of these pozzolanic materials), latently hydraulic materials, preferably ground slag sand or mixtures of two or more of these fine mineral materials. The fine mineral materials are more preferably ground rock, pozzolanic materials (preferably selected from the group consisting of fly ash, tuff, trass, silica dust and mixtures of two or more of these pozzolanic materials) or mixtures of ground rock and pozzolanic material. Fibers are preferably steel, glass or polymer fibers for fibro concrete. The term rock particle fraction refers to natural and synthetic rock particles. They either originate from natural deposits or are obtained in the reutilization of building materials or as industrial by-product. The rocks are present either as round particles or in crushed form.

The invention further provides a process for hydrophobizing materials which comprise mineral binders, wherein binder composition and hydrophobizing agent are mixed so that the hydrophobized material obtained contains from 0.1 to 10% by weight, preferably from 0.3 to 5% by weight, more preferably from 0.5 to 2.0% by weight, of hydrophobizing agent, based on the total weight of the hydrophobized material comprising mineral binders.

Without wishing to be tied to this theory, it is assumed that the application of the hydrophobizing agent to the binder composition from the formerly hydrophilic hydrophobizing agent which comprises a water-soluble polyion complex (i) results in formation of a hydrophobic composition since a water-insoluble hydrophobic 1:1 polyion complex, i.e. a hydrophobic polycation-polyanion network structure, is formed by hydrolysis during application. Without wishing to be tied to this theory, this is shown schematically below for the polyion complex (Ib) where y=7, $R_1$, $R_2$, $R_3$, $R_4$ are each methyl and Z is hydrogen, where the hydrophilicity of (Ib) is indicated by attached water molecules as shown in FIG. 5.

The invention likewise provides a hydrophobized material comprising mineral binders and obtained or obtainable by the above-described process.

The invention further provides a hydrophobized material which comprises mineral binders, comprising the reaction product of one or more mineral binder(s), preferably selected from the group consisting of cement, slaked lime and gypsum, a hydrophobizing agent according to any of the above-described embodiments and water.

The hydrophobized material preferably contains from 0.1 to 10% by weight, more preferably from 0.3 to 5% by weight, more preferably from 0.5 to 2% by weight, of hydrophobizing agent, based on the total weight of the hydrophobized material.

The present invention is illustrated further by the following embodiments and combinations of embodiments as indicated by the corresponding relationships and back-references. In particular, it should be emphasized that any instance where a range of embodiments is indicated, for example in the context of an expression such as "The process according to any of embodiments 1 to 4" is intended to explicitly disclose to a person skilled in the art any embodiment in the range, i.e. the meaning of this expression will be understood by a person skilled in the art as synonymous with "The process according to any of embodiments 1, 2, 3 and 4".

1. Hydrophobizing agent for mineral materials, comprising:
   i) a polyion complex comprising at least one polycation (i.1) and at least one polyanion (i.2), where the molar ratio of polycation:polyanion in the polyion complex is ≥1;
   ii) a silicone compound composition.
2. Hydrophobizing agent according to embodiment 1, wherein the polyion complex (i) comprises from 1 to 4 mol of polycations (i.1) per 1 mol of polyanions (i.2).
3. Hydrophobizing agent according to embodiment 1 or 2, wherein the polycations (i.1) of the polyion complex (i) are cationic polymers or copolymers, preferably cationic polymers or copolymers which comprise at least one quaternary ammonium cation and which are more preferably selected from the group consisting of
   a) poly-N,N,N-tri-$C_1$-$C_5$-alkylammonioalkyl acrylate, where the poly-N,N,N-tri-$C_1$-$C_5$-alkylammonioalkyl acrylate is preferably selected from the group consisting of poly-N,N,N-[3-(trimethylammonio)ethyl] acrylate, poly-N,N,N-[3-(trimethylammonio)propyl] acrylate, poly-N,N,N-[3-(trimethylammonio)butyl] acrylate,
      poly-N,N,N-[3-(methyldiethylammonio)propyl] acrylate and mixtures of two or more of these poly-N,N,N-tri-$C_1$-$C_5$-alkylammonioalkyl acrylates;
   b) poly-N,N,N-tri-$C_1$-$C_5$-alkylammonioalkyl methacrylate, where the poly-N,N,N-tri-$C_1$-$C_5$-alkylammonioalkyl methacrylate is preferably selected from the group consisting of poly-N,N,N-[3-(trimethylammonio)ethyl]methacrylate, poly-N,N,N-[3-(trimethylammonio)propyl]methacrylate, poly-N,N,N-[3-(trimethylammonio)butyl]methacrylate, poly-N,N,N-[3-(methyldiethylammonio)propyl]methacrylate and mixtures of two or more of these poly-N,N,N-tri-$C_1$-$C_5$-alkylammonioalkyl methacrylates;
   c) poly-N,N,N-tri-$C_1$-$C_5$-alkylammonioalkylacrylamide, where the poly-N,N,N-tri-$C_1$-$C_5$-alkylammonioalkylacrylamide is preferably selected from the group consisting of poly-N,N,N-[3-(trimethylammonio)ethyl]acrylamide, poly-N,N,N-[3-(trimethylammonio)propyl]acrylamide,
      poly-N,N,N-[3-(trimethylammonio)butyl]acrylamide, poly-N,N,N-[3-(methyldiethylammonio)propyl]acrylamide and mixtures of two or more of these poly-N,N,N-tri-$C_1$-$C_5$-alkylammonioalkylacrylamides;

d) poly-N,N,N-tri-$C_1$-$C_5$-alkylammonioalkylmethacrylamide, where the poly-N,N,N-tri-$C_1$-$C_5$-alkylammonioalkylmethacrylamide is preferably selected from the group consisting of poly-N,N,N-[3-(trimethylammonio)ethyl]methacrylamide, poly-N,N,N-[3-(trimethylammonio)propyl]methacrylamide, poly-N,N,N-[3-(trimethylammonio)butyl]methacrylamide, poly-N,N,N-[3-(methyldiethylammonio)propyl]methacrylamide and mixtures of two or more of these poly-N,N,N-tri-$C_1$-$C_5$-alkylammonioalkylmethacrylamides;

e) poly-N-3-methyl-1-vinylimidazolium;

f) quaternized poly[bis(2-chloroethyl) ether-alt-1,3-bis(3-dimethylaminopropyl)urea];

g) poly(dimethylamine-co-epichlorohydrin-co-ethylenediamine);

h) polydimethyldiallylammonium;

i) poly(dimethyldiallylammonium-co-methyldiallylamine hydrochloride); and j) poly-N,N—$R_1$,$R_2$-disubstituted-3,4-dimethylenepyrrolidinium, where $R_1$ and $R_2$ are selected independently from the group consisting of a hydrogen atom, a $C_1$-$C_{18}$-alkyl radical and a benzyl radical;

where the positive charge on the nitrogen atom of the quaternary ammonium cation is balanced by a singly charged anion, preferably an anion selected from the group of halide anion, in particular chloride anion, methosulfate anion, ethosulfate anion and mixtures of two or more of these anions.

4. Hydrophobizing agent according to any of embodiments 1 to 3, wherein the polycations (i.1) of the polyion complex (i) are cationic polymers or copolymers which comprise at least one quaternary ammonium cation and which are selected from the group consisting of a.1) poly-N,N,N-tri-$C_1$-$C_5$-alkylammonioalkyl acrylate chloride or methosulfate,
preferably selected from the group consisting of
poly-N,N,N-[3-(trimethylammonio)ethyl]acrylate chloride,
poly-N,N,N-[3-(trimethylammonio)propyl]acrylate chloride,
poly-N,N,N-[3-(trimethylammonio)butyl]acrylate chloride,
poly-N,N,N-[3-(methyldiethylammonio)propyl] acrylate methosulfate, and mixtures of two or more of these poly-N,N,N-tri-$C_1$-$C_5$-alkylammonioalkyl so acrylate chlorides or methosulfates;

b.1) poly-N,N,N-tri-$C_1$-$C_5$-alkylammonioalkyl methacrylate chloride or methosulfate,
preferably selected from the group consisting of
poly-N,N,N-[3-(trimethylammonio)ethyl]methacrylate chloride,
poly-N,N,N-[3-(trimethylammonio)propyl]methacrylate chloride,
poly-N,N,N-[3-(trimethylammonio)butyl]methacrylate chloride,
poly-N,N,N-[3-(methyldiethylammonio)propyl] methacrylate methosulfate, and mixtures of two or more of these poly-N,N,N-tri-$C_1$-$C_5$-alkylammonioalkyl methacrylate chlorides or methosulfates;

c.1) poly-N,N,N-tri-$C_1$-$C_5$-alkylammonioalkylacrylamide chloride or methosulfate,
preferably selected from the group consisting of
poly-N,N,N-[3-(trimethylammonio)ethyl]acrylamide chloride,
poly-N,N,N-[3-(trimethylammonio)propyl]acrylamide chloride,
poly-N,N,N-[3-(trimethylammonio)butyl]acrylamide chloride,
poly-N,N,N-[3-(methyldiethylammonio)propyl] acrylamide chloride, and mixtures of two or more of these poly-N,N,N-tri-$C_1$-$C_5$-alkylammonioalkylacrylamide chlorides or methosulfates;

d.1) poly-N,N,N-tri-$C_1$-$C_5$-alkylammonioalkylmethacrylamide chloride or methosulfate,
preferably selected from the group consisting of
poly-N,N,N-[3-(trimethylammonio)ethyl]methacrylamide chloride,
poly-N,N,N-[3-(trimethylammonio)propyl]methacrylamide chloride,
poly-N,N,N-[3-(trimethylammonio)butyl]methacrylamide chloride,
poly-N,N,N-[3-(methyldiethylammonio)propyl] methacrylamide chloride, and mixtures of two or more of these poly-N,N,N-tri-$C_1$-$C_5$-alkylammonioalkylmethacrylamide chlorides or methosulfates;

e.1) poly-N-3-methyl-1-vinylimidazolium chloride;

f.1) poly[bis(2-chloroethyl) ether-alt-1,3-bis(3-dimethylaminopropyl)urea], quaternized;

g.1) poly(dimethylamine-co-epichlorohydrin-co-ethylenediamine);

h.1) polydimethyldiallylammonium chloride;

i.1) poly(dimethyldiallylammonium chloride-co-methyldiallylamine hydrochloride); and j.1) poly-N,N—$R_1$,$R_2$-disubstituted-3,4-dimethylenepyrrolidinium chloride, where $R_1$ and $R_2$ are selected independently from the group consisting of a hydrogen atom, a $C_1$-$C_{18}$-alkyl radical and a benzyl radical.

5. Hydrophobizing agent according to any of embodiments 1 to 4, wherein the polycations (i.1) of the polyion complex (i) are poly-N,N-disubstituted-3,4-dimethylenepyrrolidinium salts, preferably chloride salts, of the general formula (I):

$$\left[ \begin{array}{c} \underset{R_1 \;\; R_2}{\overset{\oplus}{N}} \;\; Cl^{\ominus} \end{array} \right]_x \quad (I)$$

where
$R_1$ and $R_2$ are selected independently from the group consisting of a hydrogen atom, a $C_1$-$C_{18}$-alkyl radical and a benzyl radical;
x is an integer (degree of polymerization).

6. Hydrophobizing agent according to any of embodiments 1 to 5, wherein the polyanions (i.2) of the polyion complex (i) are copolymeric monobasic to polybasic polyanion esters (polycarboxylate ether, PCE) based on monounsaturated $C_3$-$C_{10}$-monocarboxylic, dicarboxylic and tricarboxylic acids, preferably selected from the group consisting of methacrylic acid, maleic acid, methylenesuccinic acid, aconitic acid and mixtures of two or more of these acids which are present in the form of their alkali metal salts or ammonium salts, preferably as lithium, sodium, potassium or ammonium salts, more preferably as sodium salts.

7. Hydrophobizing agent according to embodiment 6, wherein the polyanions (i.2) of the polyion complex (i) are selected from the group of polycarboxylate ethers (PCE), preferably selected from the group consisting of
poly(methacrylic acid-co-polyethylene glycol monomethyl ether methacrylate),
poly(acrylic acid-co-polyethylene glycol monomethyl ether methacrylate),
poly(methacrylic acid-co-polyethylene glycol monomethyl ether acrylate),
poly(maleic acid-co-polyethylene glycol monomethyl ether methacrylate),
poly(methacrylic acid-co-polyethylene glycol monomethyl ether methacrylamide),
poly(maleic acid-co-polyethylene glycol monomethyl ether methacrylate),
poly(itaconic acid-co-polyethylene glycol monomethyl ether methacrylate),
poly(aconitic acid-co-polyethylene glycol monomethyl ether methacrylate),
poly(maleic acid-co-polyethylene glycol monomethyl ether methacrylamide),
poly(maleic acid-co-polyethylene glycol methylamide methacrylate),
poly(methacrylic acid-co-polyethylene glycol monomethyl ether monoester of maleic acid),
poly(acrylic acid-co-polyethylene glycol monomethyl ether monoester of maleic acid),
poly(methacrylic acid-co-polyethylene glycol monomethyl ether monoester of itaconic acid),
poly(acrylic acid-co-polyethylene glycol monomethyl ether monoester of itaconic acid), poly(methacrylic acid-co-polyethylene glycol monomethyl ether monoester of aconitic acid),
poly(acrylic acid-co-polyethylene glycol monomethyl ether monoester of aconitic acid), and mixtures of two or more of these PCEs, where the polyethylene glycol (or methyl ether) radical in the anionic polymers listed above is —[$CH_2$—$CH_2$—O]$_a$—H or —[$CH_2$—$CH_2$—O]$_n$—$CH_3$, where a represents the degree of ethoxylation (number of monomeric ethylene oxide repeating units) and is an integer in the range from 1 to 100; where the negative charge is in each case balanced by one or more singly charged cation(s), preferably a cation selected from the group of alkali metal cations or ammonium cation and mixtures of two or more of these cations, preferably by sodium cation(s).

8. Hydrophobizing agent according to any of embodiments 1 to 7, wherein the polyion complex (i) has a molar ratio of polycations (i.1):polyanions (i.2) of >1, preferably in the range from 2:1 to 4:1.

9. Hydrophobizing agent according to embodiment 8, wherein the polyion complex (i) has a molar ratio of polycations (i.1):polyanions (i.2) in the range from 2:1 to 4:1; where the polycations (i.1) are preferably poly-N,N-disubstituted-3,4-dimethylenepyrrolidinium salts and the polyanions (i.2) are polyanion esters based on monounsaturated $C_3$-$C_{10}$-monocarboxylic, dicarboxylic and tricarboxylic acids of the general formula (Ia),

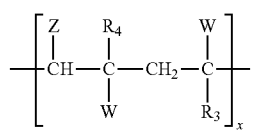

(Ia)

where
$R_3$ is a hydrogen atom or a $C_1$-$C_4$-alkyl radical, preferably a methyl group,
$R_4$ is selected from the group consisting of a hydrogen atom, a $C_1$-$C_4$-alkyl radical, preferably methyl, and a —$CH_2$—Z group, where
Z may in each case be a hydrogen atom or an N,N-disubstituted-3,4-dimethylenepyrrolidinium radical in which the positive charge on the nitrogen atom of the quaternary pyrrolidinium cation is balanced by a carboxylate anion radical, where the pyrrolidinium salt radical has the general formula (Ia.1),

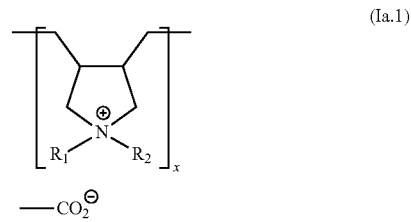

(Ia.1)

where
$R_1$, and $R_2$ are selected independently from the group consisting of a hydrogen atom, a $C_1$-$C_{18}$-alkyl radical and a benzyl radical;
x is the degree of polymerization (number of monomeric repeating units in the polymer);
W is Z or a double N,N-disubstituted-3,4-dimethylenepyrrolidinium radical in which the positive charges on the nitrogen atoms of the quaternary pyrrolidinium cations are balanced by a chloride anion and a carboxylate anion radical, where the bis-N,N-disubstituted-3,4-dimethylenepyrrolidinium salt radical has the general formula (Ia.2),

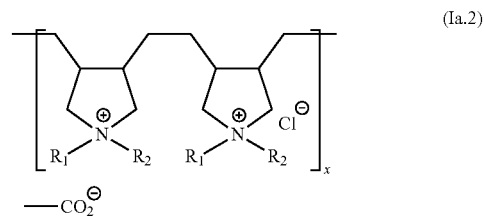

(Ia.2)

having the meanings indicated above for $R_1$, $R_2$ and x for the general formula (Ia.1), or a polyethylene glycol monomethyl ether ester radical of the general formula (Ia.3),

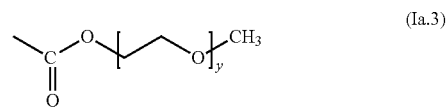

(Ia.3)

where
y is an integer from 1 to 100 (degree of ethoxylation, number of monomeric ethylene oxide repeating units).

10. Hydrophobizing agent according to embodiment 9, wherein the polyion complex (i) has the general formula (Ib),

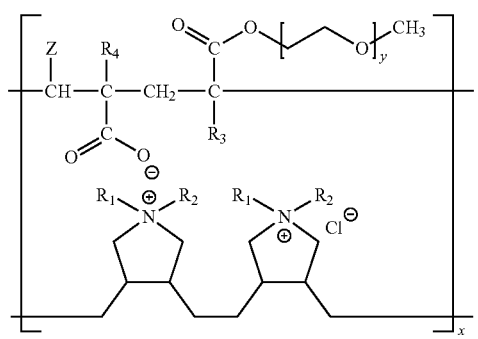

(Ib)

having the meanings indicated above for $R_1$, $R_2$, $R_3$, $R_4$, Z, x and y for the general formulae (Ia), (Ia.1) and (Ia.3).

11. Hydrophobizing agent according to any of embodiments 1 to 7, wherein the polyion complex (i) has a molar ratio of polycations (i.1):polyanions (i.2) of 1.

12. Hydrophobizing agent according to embodiment 11, wherein the polyion complex (i) comprises a copolymeric compound composed of preferably alternately arranged, molar amounts of polycations, preferably poly-N,N-disubstituted-3,4-dimethylenepyrrolidinium salts, and molar amounts of monocarboxylic esters, based on the monomeric repeating units.

13. Hydrophobizing agent according to embodiment 11 or 12, wherein the polyion complex (i) comprises a copolymeric compound composed of alternately arranged, molar amounts of poly-N,N-disubstituted-3,4-dimethylenepyrrolidinium salts and molar amounts of monocarboxylic esters of the general formula (II),

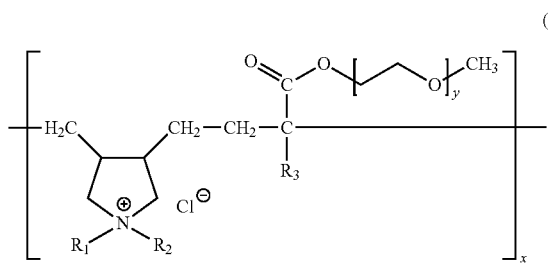

(II)

where
$R_1$, $R_2$ are selected independently from the group consisting of a hydrogen atom, a $C_1$-$C_{18}$-alkyl radical and a benzyl radical;
$R_3$ is a hydrogen atom or a $C_1$-$C_4$-alkyl radical, preferably a methyl group;
y is an integer from 1 to 100 (degree of ethoxylation, number of monomeric ethylene oxide repeating units);
x is the degree of polymerization (number of monomeric repeating units in the polymer).

14. Hydrophobizing agent according to any of embodiments 1 to 13, wherein the silicone compound composition (ii) comprises at least one silicone compound (ii.1) selected from the group consisting of monoorgano-$C_1$-$C_{20}$-trialkoxysilane, diorgano-$C_1$-$C_{20}$-dialkoxysilane, poly(organo-$C_1$-$C_{20}$-alkoxysiloxane) and mixtures of two or more of these silicone compounds.

15. Hydrophobizing agent according to embodiment 14, wherein the monoorgano-$C_1$-$C_{20}$-trialkoxysilane is selected from the group consisting of methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, isobutyltrimethoxysilane, isobutyltriethoxysilane, pentyltriethoxysilane, cyclopentyltrimethoxysilane, octyltriethoxysilane, isooctyltriethoxysilane, n-decyltriethoxysilane, dodecyltriethoxysilane, hexadecyltriethoxysilane, octadecyltrimethoxysilane, octadecyltriethoxysilane, phenyltriethoxysilane and mixtures of two or more of these monoorgano-$C_1$-$C_{20}$-trialkoxysilanes.

16. Hydrophobizing agent according to embodiment 14, wherein the diorgano-$C_1$-$C_{20}$-dialkoxysilane is selected from the group consisting of dimethyldiethoxysilane, diethyldiethoxysilane, diisopropyldimethoxysilane, diisobutyldimethoxysilane, di-n-butyldimethoxysilane, dicyclopentyldimethoxysilane, di-n-octyldiethoxysilane, dodecylmethyldiethoxysilane, n-octadecylmethyldiethoxysilane, phenylmethyldiethoxysilane, diphenyldiethoxysilane and mixtures of two or more of these diorgano-$C_1$-$C_{20}$-dialkoxysilanes.

17. Hydrophobizing agent according to embodiment 14, wherein the poly(organo-$C_1$-$C_{20}$-alkoxysiloxane) is preferably an oligo(organo-$C_1$-$C_{20}$-0,6-1,4-alkoxysiloxane) ("oligo" means a structure having from 3 to 10 repeating units), preferably obtained or obtainable from one or more monoorgano-$C_1$-$C_{20}$-trialkoxysilane(s) according to embodiment 15, preferably by heating the monoorgano-$C_1$-$C_{20}$-trialkoxysilane(s) to temperatures in the range from 50° to 130° C. in the presence of from 0.8 to 1.2 mol of water per mol of monoorgano-$C_1$-$C_{20}$-trialkoxysilane(s).

18. Hydrophobizing agent according to any of embodiments 1 to 17, wherein the weight ratio of polyion complex (i) to silicone compound composition (ii) is in the range from 1:7 to 1:17.

19. Hydrophobizing agent according to any of embodiments 1 to 18, further comprising a carrier composition (iii), wherein the carrier composition comprises at least one carrier selected from the group consisting of amorphous silicon dioxide, amorphous agglomerated silicon dioxide, quartz powder, limestone powder, aluminum oxide, illite, iron oxide and mixtures of two or more of these carriers, preferably at least amorphous agglomerated silicon dioxide.

20. Hydrophobizing agent according to embodiment 19 consisting of at least 90% by weight of polyion complex (i), silicone compound composition (ii), carrier composition (iii) and not more than 10% by weight of water, based on the total weight of the hydrophobizing agent.

21. Hydrophobizing agent according to embodiment 19 or 20, wherein the weight ratio of polyion complex (i) to silicone compound composition (ii) is in the range from 2:22 to 6:34.

22. Hydrophobizing agent according to any of embodiments 1 to 21, further comprising
(iv) optionally a surfactant composition comprising one or more surfactants, where the surfactant(s) is/are selected from the group consisting of polyethylene glycol caproate, polyethylene glycol caprylate, polyethylene glycol caprinate, polyethylene glycol monomethyl ether ester of undecylenoic acid, polyethylene glycol undecylenoate, polyethylene glycol laurate, polyethylene glycol myristate, polyethylene glycol palmitate, polyethylene glycol stearate, polyethylene glycol monomethyl ether ester of oleic acid, polyethylene glycol ricinoleate, polyethylene glycol elaidate, polyethylene glycol linoleate, polyethylene glycol linolenate, polyethylene glycol erucate, palmitic/stearic acid diethanol-block-(polypropylene glycol) amide and mixtures of two or more of these surfactants;

(v) optionally a UV dye composition comprising one or more UV dyes, where the UV dye(s) is/are selected from the group consisting of 2,2'-(2,5-thiophenediyl) bis(5-tert-butyl-1,3-benzoxazole), (disodium 4,4'-bis (2-sulfostyryl)biphenyl), fluorescein, 2,7-dichlorofluorescein, rhodamine B and mixtures of two or more of these dyes.

23. Hydrophobizing agent according to embodiment 22, consisting of at least 90% by weight of polyion complex (i), silicone compound composition (ii), carrier composition (iii) and not more than 10% by weight of water and also (iv) optionally surfactant composition and (v) optionally UV dye composition, based on the total weight of the hydrophobizing agent.

24. Process for producing a hydrophobizing agent, comprising
   i) a polyion complex comprising at least one polycation (i.1) and at least one polyanion (i.2), where the molar ratio of polycation:polyanion in the polyion complex is ≥1;
   ii) a silicone compound composition;
   iii) a carrier composition;
   wherein the process comprises the steps:
   a) Providing a polyion complex (i) in aqueous solution;
   b) Providing a carrier composition (iii);
   c) Mixing of the aqueous solution of the polyion complex (i) as per (a) with carrier composition (iii) as per (b), preferably with mechanical mixing (preferably stirring/kneading), to give a first mixture;
   d) Adding a silicone compound composition (ii) which optionally contains a surfactant composition and/or a UV dye composition to the first mixture obtained in (c), preferably with mechanical mixing (preferably stirring/kneading), to give a coated pulverulent carrier composition of the hydrophobizing agent.

25. Hydrophobizing agent obtained or obtainable by the process according to embodiment 24.

26. Use of a hydrophobizing agent according to any of embodiments 1 to 23 or of a hydrophobizing agent obtained or obtainable by the process according to embodiment 24 for the hydrophobizing of mineral binders and/or of compositions which contain mineral binders (binder composition) and/or of materials which comprise mineral binders.

27. Binder composition comprising one or more mineral binder(s), preferably selected from the group consisting of cement, slaked lime (Ca(OH)$_2$) and gypsum, and a hydrophobizing agent according to any of embodiments 1 to 23.

28. Process for hydrophobizing materials which comprise mineral binders, comprising the steps
   A) Providing a binder composition comprising one or more mineral binder(s), preferably selected from the group consisting of cement, slaked lime and gypsum;
   B) Providing a hydrophobizing agent comprising a polyion complex (i) comprising at least one polycation (i.1) and at least one polyanion (i.2), where the molar ratio of polycation:polyanion in the polyion complex is ≥1; a silicone compound composition (ii); a carrier composition (iii);
   C) Mixing of the binder composition as per (A) and the hydrophobizing agent as per (B) to give a mixture of binder composition and hydrophobizing agent;
   D) Adding water (w) to the mixture of binder composition (b) and hydrophobizing agent, preferably in a w/b ratio in the range from 0.1 to 1.0, more preferably in a w/b ratio in the range from 0.2 to 0.6, more preferably in a w/b ratio in the range from 0.3 to 0.5, as obtained in (C) and mixing of the components;
   to give a hydrophobized material comprising mineral binders.

29. Process for hydrophobizing materials which comprise mineral binders, wherein binder composition and hydrophobizing agent are mixed so that the hydrophobized material obtained comprises from 0.1 to 10% by weight, preferably from 0.3 to 5% by weight, more preferably from 0.5 to 2% by weight, of hydrophobizing agent, based on the total weight of the hydrophobized material which comprises mineral binders.

30. Hydrophobized material comprising mineral binders and obtained or obtainable by the process according to embodiment 28 or 29.

31. Hydrophobized material which comprises mineral binders, comprising the reaction product of one or more mineral binder(s), preferably selected from the group consisting of cement, slaked lime and gypsum, a hydrophobizing agent according to any of embodiments 1 to 23 and water.

32. Hydrophobized material according to embodiment 31, containing from 0.1 to 10% by weight, preferably from 0.3 to 5% by weight, more preferably from 0.5 to 2% by weight, of hydrophobizing agent, based on the total weight of the hydrophobized material.

The following examples illustrate the invention in more detail without restricting the invention to these examples.

EXAMPLES

1. Chemicals

| Polymeric active ingredients: | Details |
|---|---|
| Poly-N,N-dimethyl-3,4-dimethylenepyrrolidinium chloride | 20% strength by weight aqueous solution, molar mass: from 70 000 to 75 000 g/mol or 40% strength by weight aqueous solution, molar mass: from 25 000 to 30 000 g/mol |
| Poly(methacrylic acid-co-polyethylene glycol monomethyl ether ester of methacrylic acid) sodium salt | 25.5% strength by weight aqueous solution, 39.5% strength by weight aqueous solution, anionic copolymer |
| Carrier materials: | |
| Amorphous silicon dioxide | agglomerated, particle size: 0.15 μm, specific surface area: from 18 to 25 m$^2$/g |
| Limestone powder | Calcium carbonate (CaCO$_3$), particle size: from 0.06 to 0.15 mm, specific surface area: 1.2 m$^2$/g |
| Illite NX | Mixture comprising >50% by weight of illite and additionally proportions of quartz, feldspar, kaolinite and illite-smectite |
| Quartz powder | M8, specific surface area: 1.5 m$^2$/g, Particle size: from 27 to 75 μm, |

-continued

| Polymeric active ingredients: | Details |
|---|---|
| Siloxanes/Silanes: | |
| Oligo(isooctylethoxy-siloxane) | clear colorless liquid, Viscosity: 122 mPa · s |
| Isooctyltriethoxysilane | clear colorless liquid, Boiling point: 237° C., Viscosity: 1.9 mPa · s |
| n-octyltriethoxysilane | colorless to yellowish liquid, Boiling point: 265° C., Viscosity: 2 mPa · s |
| Isobutyltriethoxysilane | clear colorless liquid, Boiling point: 190° C. |
| Specialty surfactants: | |
| (Polyethylene glycol) ricinoleate | nonionic surfactant, colorless to yellowish, slightly turbid viscous liquid |
| UV dyes: | |
| 2,2'-(2,5-thiophenediyl)bis(5-tert-butyl-1,3-benzoxazole) | yellowish powder, Melting point: from 196 to 203° C. |
| Disodium 4,4'-bis(2-sulfostyryl)biphenyl | yellowish powder, Melting point: >300° C. |
| Binder: | |
| Cement 1 | CEM I 52.5 N: Portland cement of the strength class 52.5 N (DIN EN 197-1), produced by milling of Portland cement clinker and a sulfate carrier and optionally secondary constituents, clinker content >95% by weight |
| Cement 2 | CEM I 52.5 R: Portland cement of the strength class 52.5 R (DIN EN 197-1) produced by milling of Portland cement clinker and a sulfate carrier and optionally secondary constituents, clinker content ≥95% by weight |

2. Abbreviations

HA: Hydrophobizing agent
WA based on DW [%]: the legend on the y axis of the water absorption determination in the respective figures means "Water absorption based on the dry weight in percent"

All amounts (kg in mol) indicated in the following examples relate to salts of polyions or the monomeric repeating units on which they are based.

3. Production of the Polyion Complex Solutions

Example 1

44.0 kg (54.43 mol) of 20% strength by weight aqueous poly-N,N-dimethyl-3,4-dimethylenepyrrolidinium chloride solution and 56.0 kg (27.13 mol) of 25.5% strength by weight aqueous poly(methacrylic acid-co-polyethylene glycol monomethyl ether ester of methacrylic acid), sodium salt, solution were placed in a vessel provided with a mechanical stirrer in any order and then stirred for about 5 minutes until homogeneous. This gave 100 kg of a viscous polyion complex solution having a pH of about 8 and an active compound content of 21.5% by weight. The polycation/polyanion molar ratio in the polyion complex was 2:1.

Example 2

45.2 kg (33.9 mol) of 39.5% strength by weight aqueous poly(methacrylic acid-co-polyethylene glycol monomethyl ether ester of methacrylic acid), sodium salt, solution and 54.8 kg (67.8 mol) of 20% strength by weight aqueous poly-N,N-dimethyl-3,4-dimethylenepyrrolidinium chloride solution were placed in a stirred vessel in any order and then stirred for about 5 minutes until homogeneous.

This gave 100 kg of a viscous polyion complex solution having a pH of about 8 and an active compound content of 26.8% by weight. The polycation/polyanion molar ratio in the polyion complex was 2:1.

Example 3

37.8 kg (93.5 mol) of 40% strength by weight aqueous poly-N,N-dimethyl-3,4-dimethylenepyrrolidinium chloride solution and 62.2 kg (46.7 mol) of 39.5% strength by weight aqueous poly(methacrylic acid-co-polyethylene glycol monomethyl ether ester of methacrylic acid), sodium salt, solution were placed in a stirred vessel in any order and then stirred for about 5 minutes until homogeneous. This gave 100 kg of a viscous polyion complex solution having a pH of about 8 and an active compound content of 37.0% by weight. The polycation/polyanion molar ratio in the polyion complex was 2:1.

However, if the stirring process for the polyion complex solution proceeded either under reduced pressure (<1013 mbar) or else at atmospheric pressure (1013 mbar) with heating to 40° to 70° C. and continual removal of the liberated moisture by means of an air stream passed over the surface of the liquid, the ever more viscous solution was converted at the end into a beige-colored polyion complex powder by the evaporation process.

Example 4

28.145 kg (69.63 mol) of 40% strength by weight aqueous poly-N,N-dimethyl-3,4-dimethylenepyrrolidinium chloride solution and 71.855 kg (34.81 mol) of 25.5% strength by weight aqueous poly(methacrylic acid-co-polyethylene glycol monomethyl ether ester of methacrylic acid), sodium salt, solution were placed in a stirred vessel in any order and then stirred for about 5 minutes until homogeneous. This gave 100 kg of a viscous polyion complex solution having a pH of about 8 and an active compound content of 27.55% by weight.

The polycation/polyanion molar ratio in the polyion complex was 2:1.

4. Use of Polyion Complex Preparations Corresponding to the Compositions of Examples 1 to 4

4.1 General Methods for Coating of the Carrier Material/Production of the Powders 4.1.1 Coating of Small Amounts on the Subkilogram Scale 46 g of a carrier material, for example an amorphous agglomerated silicon dioxide or mixtures of this with limestone powder in a weight ratio of 1:1 or with quartz powder in a weight ratio of 2:1, were placed in a 400 ml glass beaker; 10 g of the polyion complex of Example 1 were added thereto while stirring slowly. After the addition was complete, the mixture was stirred for a further 30 minutes.

Likewise while stirring, 17 g of a mixture consisting of an oligo(isooctyl/n-octylalkoxysiloxane) (8 g) and an alkyltrialkoxysilane (8 g) or a component thereof on its own, then 1 g of a surfactant [polyethylene glycol ricinoleate] as auxiliary and a UV dye [for example 2,2'-(2,5-thiophenediyl)bis(5-tert-butyl-1,3-benzoxazole)] were then added a little at a time. After the addition was complete, the mixture was likewise stirred for another one hour. The product obtained was checked for its wettability with water.

The coated material could then be used and characterized in the further studies.

4.1.2 Coating of Amounts on the Kilogram Scale 1380 g of a carrier material, for example an amorphous agglomerated silicon dioxide or mixtures of this with limestone powder in a weight ratio of 1:1 or with quartz powder in a weight ratio of 2:1, were placed in a 10 l stirred vessel; 300 g of the polyion complex of Example 1 were added thereto while stirring slowly. After the addition was complete, the mixture was stirred for a further 30 minutes.

Likewise while stirring, 510.5 g of a mixture consisting of an oligo(isooctyl/n-octylalkoxysiloxane) (240 g) and an alkyltrialkoxysilane (240 g) or a component thereof on its own, then 30 g of a surfactant [polyethylene glycol ricinoleate] as auxiliary and a UV dye [0.5 g of for example 2,2'-(2,5-thiophenediyl)bis(5-tert-butyl-1,3-benzoxazole)] were then added a little at a time. After the addition was complete, the mixture was likewise stirred for another one hour. The product obtained was checked for its wettability with water.

The coated material could then be used and characterized in the further studies.

4.1.3 Coating on the 10 kg Scale 6.9 kg of a carrier material, for example an amorphous agglomerated silicon dioxide or mixtures thereof with limestone powder in a weight ratio of 1:1 or with quartz powder in a weight ratio of 2:1, were placed in a 30 l kneading vessel; while kneading, 1.5 kg of the polyion complex of Example 1 were added thereto. After the addition was complete, kneading was continued for 40 minutes.

Likewise while kneading, 2.553 kg of a mixture consisting of an oligo(isooctyl/n-octylalkoxysiloxane) (1.2 kg) and an alkyltrialkoxysilane (1.2 kg) or a component thereof on its own, then 150 g of a surfactant [polyethylene glycol ricinoleate] as auxiliary and also a UV dye [2.5 g of 2,2'-(2,5-thiophenediyl)bis(5-tert-butyl-1,3-benzoxazole)] were then added a little at a time. After the addition was complete, kneading was likewise continued for 1.2 hours. The product obtained was tested for its wettability with water. The coated material could then be used and characterized in the further studies.

4.1.4 Coating on the 100 kg Scale 69 kg of a carrier material, for example an amorphous agglomerated silicon dioxide or mixtures thereof with limestone powder in a weight ratio of 1:1 or with quartz powder in a weight ratio of 2:1, were placed in a 300 l stirred vessel; while stirring slowly, 12 kg of the polyion complex of Example 2 were added thereto. After the addition was complete, the mixture was stirred further for some minutes, with the after-stirring time being in the range from 5 to 30 minutes. Likewise while stirring, 25.525 kg of a mixture consisting of an oligo(isooctyl/n-octylalkoxysiloxane) (12 kg) and an alkyltrialkoxysilane (12 kg) or a component thereof on its own, then 1.5 kg of a surfactant [polyethylene glycol ricinoleate] as auxiliary and also a UV dye [25 g of 2,2'-(2,5-thiophenediyl)bis(5-tert-butyl-1,3-benzoxazole)] were then added a little at a time. After the addition was complete, stirring was likewise continued for 5-60 minutes. The after-stirring times after addition of the polyion complex or after addition of the siloxane/silane were varied as a function of the carrier material used; thus, relatively short after-stirring times of 5-10 minutes in both steps were sufficient in the case of amorphous agglomerated silicon dioxide, while longer after-stirring times of up to 30 minutes or up to 60 minutes were better for other carrier materials such as limestone powder or quartz powder in order to achieve complete coating. The product obtained was checked for its wettability with water. The coated material could then be used and characterized in the further studies.

4.2 Production of the Powders

The following powders were produced according to method 1 of 4.1:

Powder 1
   46.0 g of amorphous agglomerated silicon dioxide
   10.0 g of polyion complex as per Example 1
   16.0 g of n-octyltriethoxysilane
   1.0 g of polyethylene glycol ricinoleate Powder 2
   46.0 g of amorphous agglomerated silicon dioxide
   10.0 g of polyion complex as per Example 1
   16.0 g of isooctyl triethoxysilane
   1.0 g of polyethylene glycol ricinoleate Powder 3
   46.0 g of amorphous agglomerated silicon dioxide
   10.0 g of polyion complex as per Example 1
   16.0 g of oligo(isooctylethoxysiloxane)
   1.0 g of polyethylene glycol ricinoleate Powder 4
   46.0 g of amorphous agglomerated silicon dioxide
   10.0 g of polyion complex as per Example 1
   20.0 g of n-octyltriethoxysilane
   1.0 g of polyethylene glycol ricinoleate Powder 5
   46.0 g of amorphous agglomerated silicon dioxide
   10.0 g of polyion complex as per Example 1
   32.0 g of n-octyltriethoxysilane
   1.0 g of polyethylene glycol ricinoleate Powder 6
   46.0 g of illite NX
   10.0 g of polyion complex as per Example 1
   16.0 g of oligo(isooctylethoxysiloxane)
   1.0 g of polyethylene glycol ricinoleate Powder 7
   46.0 g of illite NX
   10.0 g of polyion complex as per Example 1
   16.0 g of n-octyltriethoxysilane
   1.0 g of polyethylene glycol ricinoleate Powder 8
   46.0 g of illite NX
   10.0 g of polyion complex as per Example 1
   16.0 g of n-octyltriethoxysilane
   1.0 g of polyethylene glycol ricinoleate Powder 9
   46.0 g of quartz powder
   10.0 g of polyion complex as per Example 1
   8.0 g of n-octyltriethoxysilane
   1.0 g of polyethylene glycol ricinoleate Powder 10
   46.0 g of limestone powder
   10.0 g of polyion complex as per Example 1
   8.0 g of n-octyltriethoxysilane
   1.0 g of polyethylene glycol ricinoleate Powder 11
   46.0 g of amorphous agglomerated silicon dioxide
   10.0 g of polyion complex as per Example 1
   8.0 g of oligo(isooctylethoxysiloxane)
   8.0 g of n-octyltriethoxysilane
   1.0 g of polyethylene glycol ricinoleate Powder 12
   46.0 g of amorphous agglomerated silicon dioxide
   7.5 g of polyion complex as per Example 1
   8.0 g of oligo(isooctylethoxysiloxane)
   8.0 g of n-octyltriethoxysilane
   1.0 g of polyethylene glycol ricinoleate Powder 13
  46.0 g of amorphous agglomerated silicon dioxide
  5.0 g of polyion complex as per Example 1
  8.0 g of oligo(isooctylethoxysiloxane)
  8.0 g of n-octyltriethoxysilane
  1.0 g of polyethylene glycol ricinoleate
Powder 14
  46.0 g of amorphous agglomerated silicon dioxide
  10.0 g of polyion complex as per Example 1
  8.0 g of oligo(isooctylethoxysiloxane)
  8.0 g of isobutyltriethoxysilane
  1.0 g of polyethylene glycol ricinoleate
Powder 15
  46.0 g of amorphous agglomerated silicon dioxide
  5.0 g of polyion complex as per Example 1
  8.0 g of oligo(isooctylethoxysiloxane)
  8.0 g of isobutyltriethoxysilane
  1.0 g of polyethylene glycol ricinoleate
Powder 16
  46.0 g of quartz powder
  10.0 g of polyion complex as per Example 1
  8.0 g of oligo(isooctylethoxysiloxane)
  1.0 g of polyethylene glycol ricinoleate
Powder 17
  46.0 g of quartz powder
  10.0 g of polyion complex as per Example 1
  4.0 g of oligo(isooctylethoxysiloxane)
  4.0 g of n-octyltriethoxysilane
  1.0 g of polyethylene glycol ricinoleate
Powder 18
  46.0 g of quartz powder
  5.0 g of polyion complex as per Example 1
  4.0 g of oligo(isooctylethoxysiloxane)
  4.0 g of n-octyltriethoxysilane
  1.0 g of polyethylene glycol ricinoleate
Powder 19
  30.0 g of amorphous agglomerated silicon dioxide
  16.0 g of quartz powder
  10.0 g of polyion complex as per Example 1
  8.0 g of oligo(isooctylethoxysiloxane)
  8.0 g of n-octyltriethoxysilane
  1.0 g of polyethylene glycol ricinoleate
Powder 20
  23.0 g of amorphous agglomerated silicon dioxide
  23.0 g of limestone powder
  10.0 g of polyion complex as per Example 1
  8.0 g of oligo(isooctylethoxysiloxane)
  8.0 g of n-octyltriethoxysilane
  1.0 g of polyethylene glycol ricinoleate
Powder 21
  23.0 g of amorphous agglomerated silicon dioxide
  23.0 g of limestone powder
  10.0 g of polyion complex as per Example 1
  16.0 g of n-octyltriethoxysilane
  1.0 g of polyethylene glycol ricinoleate
Powder 22
  46.0 g of amorphous agglomerated silicon dioxide
  10.0 g of polyion complex as per Example 1
  30.0 g of oligo(isooctylethoxysiloxane)
  1.0 g of polyethylene glycol ricinoleate
Powder 23
  46.0 g of amorphous agglomerated silicon dioxide
  7.8 g of polyion complex as per Example 4
  8.0 g of oligo(isooctylethoxysiloxane)
  8.0 g of n-octyltriethoxysilane
  1.0 g of polyethylene glycol ricinoleate
  0.01 g of 2,2'-(2,5-thiophenediyl)bis(5-tert-butyl-1,3-benzoxazole)
Powder 24
  23.0 g of amorphous silicon dioxide
  23.0 g of limestone powder
  7.8 g of polyion complex as per Example 4
  8.0 g of oligo(isooctylethoxysiloxane)
  8.0 g of n-octyltriethoxysilane
  1.0 g of polyethylene glycol ricinoleate
  0.01 g of 2,2'-(2,5-thiophenediyl)bis(5-tert-butyl-1,3-benzoxazole)
Powder 25
  46.0 g of amorphous agglomerated silicon dioxide
  7.5 g of polyion complex as per Example 1
  8.0 g of oligo(isooctylethoxysiloxane)
  8.0 g of n-octyltriethoxysilane
  1.0 g of polyethylene glycol ricinoleate
  0.01 g of (disodium 4,4'-bis(2-sulfostyryl)biphenyl)
Powder 26
  46.0 g of amorphous agglomerated silicon dioxide
  7.5 g of polyion complex as per Example 1
  8.0 g of oligo(isooctylethoxysiloxane)
  8.0 g of n-octyltriethoxysilane
  1.0 g of polyethylene glycol ricinoleate
  0.01 g of 2,2'-(2,5-thiophenediyl)bis(5-tert-butyl-1,3-benzoxazole)
Powder 27
  46.6 g of amorphous agglomerated silicon dioxide
  10.0 g of polyion complex as per Example 1
  8.0 g of oligo(isooctylethoxysiloxane)
  8.0 g of isooctyltriethoxysilane
  1.0 g of polyethylene glycol ricinoleate
Powder 28
  23.0 g of amorphous agglomerated silicon dioxide
  23.0 g of limestone powder
  10.0 g of polyion complex as per Example 1
  8.0 g of oligo(isooctylethoxysiloxane)
  8.0 g of isooctyltriethoxysilane
  1.0 g of polyethylene glycol ricinoleate
Powder 29
  46.6 g of amorphous agglomerated silicon dioxide
  10.0 g of polyion complex as per Example 1
  8.0 g of oligo(isooctylethoxysiloxane)
  8.0 g of isooctyltriethoxysilane
  1.0 g of polyethylene glycol ricinoleate
  0.01 g of 2,2'-(2,5-thiophenediyl)bis(5-tert-butyl-1,3-benzoxazole)
Powder 30
  23.0 g of amorphous agglomerated silicon dioxide
  23.0 g of limestone powder
  10.0 g of polyion complex as per Example 1
  8.0 g of oligo(isooctylethoxysiloxane)
  8.0 g of isooctyltriethoxysilane
  1.0 g of polyethylene glycol ricinoleate
  0.01 g of 2,2'-(2,5-thiophenediyl)bis(5-tert-butyl-1,3-benzoxazole)
Powder 31
  23.0 g of amorphous agglomerated silicon dioxide
  23.0 g of limestone powder
  10.0 g of polyion complex as per Example 1
  8.0 g of oligo(isooctylethoxysiloxane)
  8.0 g of n-octyltriethoxysilane
  1.0 g of polyethylene glycol ricinoleate
  0.01 g of 2,2'-(2,5-thiophenediyl)bis(5-tert-butyl-1,3-benzoxazole)

Powder 32
  23.0 g of amorphous agglomerated silicon dioxide
  23.0 g of limestone powder
    8.01 g of polyion complex as per Example 2
    8.0 g of oligo(isooctylethoxysiloxane)
    8.0 g of n-octyltriethoxysilane
    1.0 g of polyethylene glycol ricinoleate
    0.01 g of 2,2'-(2,5-thiophenediyl)bis(5-tert-butyl-1,3-benzoxazole)
Powder 33
  23.0 g of amorphous agglomerated silicon dioxide
  23.0 g of limestone powder
    5.82 g of polyion complex as per Example 3
    8.0 g of oligo(isooctylethoxysiloxane)
    8.0 g of n-octyltriethoxysilane
    1.0 g of polyethylene glycol ricinoleate
    0.01 g of 2,2'-(2,5-thiophenediyl)bis(5-tert-butyl-1,3-benzoxazole)

Testing of the Wettability of the Powders 1 to 33 with Water

To test the hydrophilic surface behavior, about 1 g of one of the powder compositions 1 to 33 was admixed with about 30 ml of water in a glass beaker and stirred with a glass rod. The stirred-up dispersion was left to stand, and the fully wetted and individualized carrier material particles settled on the bottom of the glass beaker due to the density difference between the particles and the water.

Possible floating, unwetted hydrophobic carrier material particles or silane/siloxane droplets were not observed at the surface of the water.

The coated materials (powders 1 to 33) having the above-described compositions as per 4.2, which had been produced by the method 4.1.1 of 4.1, were mixed with appropriate binders in the following methods and experiments and the products obtained therefrom were then examined in respect of their hydrophobic behavior. This was documented and demonstrated by contact angle measurements and the time-dependent capillary water absorption.

4.3 Specimen Production

The two cements "CEM I 52.5 N" and "CEM I 52.5 R" were used as binder.

The cement "CEM I 52.5 N" was used for specimens with powders 1-10, while the cement "CEM I 52.5 R" was used for the specimens with powders 11-22 and also powders 25-31.

Firstly, 300 g of binder were weighed into the mortar cup. The calculated amount of the respective hydrophobizing agent powder from 4.2 was added to the binder. The dry powders were carefully premixed using a large spatula. The dry mixture was subsequently transferred to the disposable cup.

120 ml of water corresponding to a w/z ratio (water/cement) of 0.4 were added to the dry mixture. The mixture was stirred for 3.5 minutes using the manual stirring device, commencing at setting 2 with increase to settings 4-6. The mixture was then poured out and distributed over the two Petri dishes (in the smaller part) and the cup and the containers were covered.

4.4 Examination of the Specimens 4.4.1 General

One series of specimens consists of a reference, i.e. a specimen without hydrophobizing agent powder, and the specimens containing hydrophobizing agent powder (two-three different concentrations). Comparisons should be made only within one series of specimens.

4.4.2 Determination of the Capillary Water Absorption

The capillary water absorption was determined on disks resulting from casting into a Petri dish by complete immersion in water. To prepare for the test, the test specimens produced as described in 4.3 were uncovered and removed from the mold at the earliest after 7 days. The set cement test specimens were conditioned for at least four days at $(20\pm2°)$ C and $(65\pm5°$ C.) The disks were weighed dry, placed in the water and then weighed at the same time of day on days 1, 3 (4), day 7 (8), day 14, day 21 and day 28. The weight was entered into a table and the increase in weight (capillary water absorption) was calculated as a percentage of the dry weight.

4.4.3 Contact Angle Measurements

The contact angle measurements were carried out using distilled water and took place firstly on the surfaces of a disk from a Petri dish and secondly on a profile sawn from the test specimen from the cup. A schematic depiction may be found in FIG. 1.

For the measurement of the contact angle on the surface, the disks were uncovered after not less than two days and conditioned for at least 24 hours at $(20\pm2°)$ C and $(65\pm5°$ C.) The values were entered in a table and the average was formed. This average had to be at least 90° for a hydrophobizing agent to be said to have a hydrophobic effect.

To measure the contact angle in profile, the cup specimens were removed from the mold after about three days and an about 0.5-1.5 cm thick disk having faces which were as parallel as possible was cut. The contact angle was measured at five places on this disk from the bottom to the surface. The values were entered in a table. Firstly, an average was calculated from these values. Secondly, the distribution of the hydrophobizing agent in the profile was compared with the aid of a graph.

4.5 Characterization of the Specimens 4.5.1 Series 1: Powder 1-Powder 10, Content 1.5% by Weight In the first series, specimens having a content of 1.5% by weight of the respective hydrophobizing agent powder (ZPn 1.5%, n=1, . . . , 10) from 4.2 were produced, where the percentage reported related to the respective percentages by weight, in addition to a reference without addition (Z0). The water absorption and also the contact angle of water on the surfaces of the disks were determined as described above on these specimens. The results of the capillary water absorption are reported in Table 1 below, and the results of the contact angle measurements are reported in Table 2.

TABLE 1

Results of the water absorption

| | 0 days | 1 day | 3 days | 8 days | 14 days | 21 days | 28 days |
|---|---|---|---|---|---|---|---|
| Z0 | 0.00% | 9.23% | 9.46% | 9.60% | 9.74% | 9.73% | 10.00% |
| ZP1 1.5% | 0.00% | 3.76% | 4.75% | 5.75% | 6.18% | 6.48% | 6.91% |
| ZP2 1.5% | 0.00% | 3.11% | 4.01% | 4.70% | 5.22% | 5.37% | 5.74% |
| ZP3 1.5% | 0.00% | 2.84% | 3.80% | 4.80% | 5.01% | 5.23% | 5.70% |
| ZP4 1.5% | 0.00% | 3.63% | 5.24% | 5.99% | 6.28% | 6.64% | 7.28% |
| ZP5 1.5% | 0.00% | 3.63% | 4.59% | 5.44% | 5.88% | 6.27% | 6.68% |
| ZP6 1.5% | 0.00% | 6.54% | 7.26% | 7.73% | 7.94% | 8.09% | 8.51% |
| ZP7 1.5% | 0.00% | 5.32% | 6.40% | 7.27% | 7.57% | 7.89% | 8.42% |
| ZP8 1.5% | 0.00% | 4.30% | 5.28% | 6.28% | 7.13% | 6.89% | 7.40% |
| ZP9 1.5% | 0.00% | 5.29% | 6.65% | 7.94% | 8.34% | 8.76% | 9.42% |

TABLE 1-continued

Results of the water absorption

|  | 0 days | 1 day | 3 days | 8 days | 14 days | 21 days | 28 days |
|---|---|---|---|---|---|---|---|
| ZP10 1.5% | 0.00% | 4.26% | 5.49% | 6.77% | 7.29% | 7.84% | 8.44% |

TABLE 2

Results of the contact angle measurements

| Specimen | Av. [°] |
|---|---|
| Z0 | 0.0 |
| ZP1 1.5% | 123.8 |
| ZP2 1.5% | 111.5 |
| ZP3 1.5% | 106.6 |
| ZP4 1.5% | 111.5 |
| ZP5 1.5% | 121.3 |
| ZP6 1.5% | 87.6 |
| ZP7 1.5% | 114.9 |
| ZP8 1.5% | 120.3 |
| ZP9 1.5% | 130.7 |
| ZP10 1.5% | 139.4 |

In the case of all specimens produced using the powders 1-10, the capillary water absorption was lower than in the case of the reference without hydrophobizing agent. The water absorption was reduced most clearly in the case of the specimens produced using the powders 2 and 3. On day 1 and day 3, the water absorption was highest in the case of the specimen with powder 6, and from day 8 onward was highest in the case of the specimen with powder 9.

With the exception of the reference and the specimen with powder 6, all specimens achieved a contact angle average on the surface above 100° and could thus be said to be hydrophobic.

4.5.2 Series 2: Powders 1-5, 9 and 10, Contents 0.5% by Weight and 1% by Weight

In the second series, specimens having a content of 0.5% by weight and 1% by weight of the hydrophobizing agent powders 1-5 and the hydrophobizing agent powders 9 and 10 from 4.2 were produced in addition to a reference without addition (ZP0). The designations followed the pattern ZPn 0.5% and ZPn 1% for n=1, 5, 9, 10, where the respective % value relates to the percent by weight mentioned. The capillary water absorption and the contact angles on the surfaces of the disks were determined as described above on these specimens. The results of the water absorption determinations are reported in Table 3, and the results of the contact angle measurements are reported in Table 4.

TABLE 3

Results of the water absorption

|  | 0 days | 1 day | 7 days | 14 days | 21 days | 28 days |
|---|---|---|---|---|---|---|
| ZP0 | 0.00% | 6.74% | 7.14% | 7.30% | 7.41% | 7.47% |
| ZP1 0.5% | 0.00% | 4.06% | 5.73% | 6.35% | 6.65% | 6.93% |
| ZP1 1% | 0.00% | 3.01% | 4.68% | 5.47% | 5.78% | 6.05% |
| ZP2 0.5% | 0.00% | 3.75% | 5.10% | 5.65% | 5.88% | 6.09% |
| ZP2 1% | 0.00% | 2.53% | 3.95% | 4.54% | 4.85% | 5.09% |
| ZP3 0.5% | 0.00% | 3.75% | 5.16% | 5.66% | 6.12% | 6.07% |
| ZP3 1% | 0.00% | 2.92% | 4.51% | 5.10% | 5.32% | 5.49% |
| ZP4 0.5% | 0.00% | 3.35% | 5.04% | 5.70% | 6.09% | 6.40% |
| ZP4 1% | 0.00% | 3.01% | 4.79% | 5.52% | 5.88% | 6.16% |
| ZP5 0.5% | 0.00% | 3.89% | 5.71% | 6.33% | 6.70% | 6.92% |
| ZP5 1% | 0.00% | 2.61% | 4.32% | 5.00% | 5.46% | 5.67% |

TABLE 3-continued

Results of the water absorption

|  | 0 days | 1 day | 7 days | 14 days | 21 days | 28 days |
|---|---|---|---|---|---|---|
| ZP9 0.5% | 0.00% | 4.55% | 6.07% | 6.68% | 7.03% | 7.35% |
| ZP9 1% | 0.00% | 3.08% | 4.75% | 5.49% | 5.89% | 6.19% |
| ZP10 0.5% | 0.00% | 3.69% | 5.13% | 5.81% | 6.20% | 6.43% |
| ZP10 1% | 0.00% | 2.80% | 4.45% | 5.13% | 5.55% | 5.80% |

TABLE 4

Results of the contact angle measurements

| Specimen | Av. [°] |
|---|---|
| ZP0 | 17.02 |
| ZP1 0.5% | 119.00 |
| ZP1 1% | 136.53 |
| ZP2 0.5% | 113.35 |
| ZP2 1% | 122.69 |
| ZP3 0.5% | 114.14 |
| ZP3 1% | 117.62 |
| ZP4 0.5% | 135.86 |
| ZP4 1% | 135.92 |
| ZP5 0.5% | 139.46 |
| ZP5 1% | 122.92 |
| ZP9 0.5% | 138.31 |
| ZP9 1% | 136.09 |
| ZP10 0.5% | 142.72 |
| ZP10 1% | 137.23 |

For all specimens produced using in series 2, the capillary water absorption was lower than in the case of the reference without hydrophobizing agent. The specimens with 1% by weight addition of hydrophobizing agent powders reduced the water absorption to a greater degree than the specimens with 0.5% by weight addition. The water absorption was lowered most distinctly in both cases by powders 2 and 3, the least by powder 9.

All averages were above 110° and the surfaces of the disks could therefore be described as hydrophobic.

4.5.3 Series 3: Powders 11-22, Contents 1% by Weight, 1.5% by Weight and 2% by Weight In the third series, specimens having a content of 1% by weight, 1.5% by weight and 2% by weight addition of hydrophobizing agent powders 11-22 from 4.2 were produced in addition to a reference without addition (Z0Ref). The designations followed the pattern ZPn 1%, ZPn 1.5% and ZPn 2% for n=11, 22, where the respective % value relates to the % by weight mentioned. The water absorption, the contact angle on the surfaces of the disks and in profile (see FIG. 1, right-hand image) were determined as described above on these specimens. The results of the water absorption determinations are reported in Table 5, the results of the contact angle measurements for some selected powders containing 2% are reported in Table 6 and the results of the individual measurements in profile for the powder 22 are reported in Table 7.

TABLE 5

Results of the water absorption

|  | 0 days | 1 day | 3 days | 7 days | 14 days | 21 days | 28 days |
|---|---|---|---|---|---|---|---|
| Z0Ref | 0.00% | 5.28% | 5.67% | 5.78% | 6.08% | 6.22% | 6.30% |
| ZP11 1% | 0.00% | 1.98% | 2.89% | 3.24% | 3.81% | 4.07% | 4.33% |

TABLE 5-continued

Results of the water absorption

| | 0 days | 1 day | 3 days | 7 days | 14 days | 21 days | 28 days |
|---|---|---|---|---|---|---|---|
| ZP11 1.5% | 0.00% | 1.82% | 2.81% | 3.30% | 3.71% | 4.07% | 4.29% |
| ZP11 2% | 0.00% | 1.66% | 2.59% | 3.01% | 3.49% | 3.81% | 4.12% |
| ZP12 1% | 0.00% | 2.22% | 3.05% | 3.35% | 3.81% | 4.12% | 4.36% |
| ZP12 1.5% | 0.00% | 1.76% | 2.59% | 2.95% | 3.44% | 3.76% | 3.97% |
| ZP12 2% | 0.00% | 1.74% | 2.63% | 3.08% | 3.52% | 3.83% | 4.13% |
| ZP13 1% | 0.00% | 2.45% | 3.26% | 3.62% | 4.08% | 4.44% | 4.66% |
| ZP13 1.5% | 0.00% | 2.28% | 3.11% | 3.54% | 4.01% | 4.39% | 4.57% |
| ZP13 2% | 0.00% | 1.96% | 2.84% | 3.23% | 3.72% | 4.00% | 4.30% |
| ZP14 1% | 0.00% | 4.65% | 5.04% | 5.24% | 5.52% | 5.70% | 5.95% |
| ZP14 1.5% | 0.00% | 2.17% | 3.04% | 3.49% | 4.01% | 4.32% | 4.56% |
| ZP14 2% | 0.00% | 2.08% | 3.09% | 3.62% | 4.09% | 4.38% | 4.66% |
| ZP15 1% | 0.00% | 4.42% | 4.85% | 5.14% | 5.38% | 5.61% | 5.76% |
| ZP15 1.5% | 0.00% | 3.72% | 4.39% | 4.72% | 5.11% | 5.37% | 5.63% |
| ZP15 2% | 0.00% | 2.58% | 3.51% | 3.95% | 4.44% | 4.75% | 5.08% |
| ZP16 1% | 0.00% | 2.62% | 3.36% | 3.77% | 4.24% | 4.59% | 4.79% |
| ZP16 1.5% | 0.00% | 2.16% | 2.99% | 3.44% | 3.93% | 4.26% | 4.61% |
| ZP16 2% | 0.00% | 1.98% | 2.91% | 3.37% | 4.08% | 4.18% | 4.41% |
| ZP17 1% | 0.00% | 3.56% | 4.27% | 4.71% | 5.28% | 5.48% | 6.04% |
| ZP17 1.5% | 0.00% | 2.50% | 3.34% | 3.83% | 4.37% | 4.64% | 4.94% |
| ZP17 2% | 0.00% | 1.87% | 2.72% | 3.22% | 3.85% | 4.04% | 4.33% |
| ZP18 1% | 0.00% | 2.47% | 3.24% | 3.71% | 4.21% | 4.49% | 4.81% |
| ZP18 1.5% | 0.00% | 2.31% | 3.01% | 3.44% | 3.94% | 4.24% | 4.53% |
| ZP18 2% | 0.00% | 2.06% | 3.36% | 3.73% | 4.34% | 4.71% | 5.04% |
| ZP19 1% | 0.00% | 2.43% | 3.45% | 3.96% | 4.60% | 5.08% | 5.41% |
| ZP19 1.5% | 0.00% | 1.83% | 2.74% | 3.11% | 3.69% | 4.07% | 4.30% |
| ZP19 2% | 0.00% | 2.11% | 3.29% | 3.74% | 4.28% | 4.75% | 5.06% |
| ZP20 1% | 0.00% | 2.11% | 2.98% | 3.46% | 4.07% | 4.36% | 4.55% |
| ZP20 1.5% | 0.00% | 1.80% | 2.70% | 3.07% | 3.72% | 4.02% | 4.24% |
| ZP20 2% | 0.00% | 1.72% | 2.69% | 3.14% | 3.71% | 4.10% | 4.34% |
| ZP21 1% | 0.00% | 2.20% | 3.19% | 3.64% | 4.21% | 4.61% | 4.83% |
| ZP21 1.5% | 0.00% | 1.98% | 2.88% | 3.42% | 3.86% | 4.37% | 4.55% |
| ZP21 2% | 0.00% | 1.67% | 2.64% | 3.00% | 3.55% | 3.86% | 4.11% |
| ZP22 1% | 0.00% | 2.15% | 3.03% | 3.41% | 3.87% | 4.26% | 4.47% |
| ZP22 1.5% | 0.00% | 2.09% | 3.03% | 3.37% | 3.98% | 4.22% | 4.48% |
| ZP22 2% | 0.00% | 1.75% | 2.51% | 2.78% | 3.17% | 3.83% | 4.06% |

TABLE 6

Results of the contact angle measurements for the powders 17-19 and 21-22 at 2% by weight in each case

| Specimen | Av. [°] |
|---|---|
| Z0Ref | 43.44 |
| ZP17 2% | 116.89 |
| ZP18 2% | 106.45 |
| ZP19 2% | 107.23 |
| ZP21 2% | 105.05 |
| ZP22 2% | 103.85 |

TABLE 7

Results of the individual measurements in profile (powder 22)

| | Height from the underside of the test specimen in cm | | | | | |
|---|---|---|---|---|---|---|
| Specimen | 1 | 2 | 3 | 4 | 5 | Av. [°] |
| Z0Ref | 39.20 | 26.02 | 18.74 | 38.77 | 48.91 | 35.33 |
| ZP22 2% | 93.33 | 106.95 | 106.26 | 114.12 | 99.60 | 105.05 |

The water absorption was reduced in all specimens examined by the addition of the hydrophobizing agent powders. The reduction in the water absorption tended to be greater, the greater the content of the hydrophobizing agent powder. In the case of the specimens with 1% by weight addition, the water absorption was reduced to the greatest extent by the addition of the powders 11 and 12, while it was reduced to the least extent by the addition of the powders 14 and 15. In the case of the specimens with 1.5% by weight addition, the addition of the powders 12 and 20 brought about the best reduction in the water absorption, while the addition of powders 15 and 17 brought about the poorest. In the case of the specimens with 2% by weight addition, the water absorption was decreased most greatly by the addition of the powders 11 and 22, and the least by the powders 15 and 18.

The curve of the averages of the contact angles in profile, shown by way of example for the powder 22 and a content of 2% by weight, indicated a largely uniform distribution of the hydrophobizing agent powder over the height of the test specimen (see FIG. 2).

4.5.4 Series 4: Powders 25-31, Contents 0.5% by Weight, 1% by Weight and 1.5% by Weight In the fourth series, specimens having a content of 0.5% by weight, 1% by weight and 1.5% by weight addition of the hydrophobizing agent powders 26-31 from 4.2 were produced in addition to a reference without addition (ZA). The designations followed the pattern ZPn 0.5%, ZPn 1% and ZPn 1.5% for n=26, . . . , 31, where the respective % value relates to the % by weight mentioned. The water absorption, the contact angles on the surfaces of the disks and in profile were determined as described above on these specimens. The results of the water absorption determinations are reported in Table 8, while the results of the contact angle measurements are reported in Table 9.

TABLE 8

Results of the water absorption determinations

| | 0 days | 1 day | 4 days | 7 days | 14 days | 21 days | 28 days |
|---|---|---|---|---|---|---|---|
| ZA | 0.00% | 6.27% | 6.52% | 6.63% | 6.98% | 7.01% | 7.13% |
| ZP26 | 0.00% | 4.29% | 5.51% | 6.00% | 6.71% | 6.91% | 7.17% |

TABLE 8-continued

Results of the water absorption determinations

| | 0 days | 1 day | 4 days | 7 days | 14 days | 21 days | 28 days |
|---|---|---|---|---|---|---|---|
| ZP26 0.5% | 0.00% | 3.06% | 4.43% | 5.14% | 6.27% | 6.51% | 6.93% |
| ZP26 1% | 0.00% | 2.63% | 3.72% | 4.29% | 5.16% | 5.44% | 5.81% |
| ZP26 1.5% | 0.00% | 3.66% | 4.68% | 5.11% | 5.75% | 5.99% | 6.28% |
| ZP27 0.5% | 0.00% | 2.37% | 3.46% | 4.05% | 4.81% | 5.13% | 5.52% |
| ZP27 1% | 0.00% | 2.95% | 4.06% | 4.63% | 5.53% | 5.66% | 6.09% |
| ZP27 1.5% | 0.00% | 2.20% | 3.24% | 3.79% | 4.58% | 4.79% | 5.15% |
| ZP28 0.5% | 0.00% | 1.83% | 2.76% | 3.26% | 4.04% | 4.27% | 4.66% |
| ZP28 1% | 0.00% | 1.66% | 2.47% | 2.92% | 3.56% | 3.78% | 4.13% |
| ZP28 1.5% | 0.00% | 2.60% | 3.63% | 4.15% | 5.05% | 5.20% | 5.55% |
| ZP29 0.5% | 0.00% | 1.97% | 2.91% | 3.34% | 4.18% | 4.26% | 4.58% |
| ZP29 1% | 0.00% | 1.81% | 2.75% | 3.16% | 3.75% | 4.02% | 4.38% |
| ZP29 1.5% | 0.00% | 2.48% | 3.50% | 3.97% | 4.69% | 4.99% | 5.41% |
| ZP30 0.5% | 0.00% | 2.09% | 2.97% | 3.40% | 4.02% | 4.34% | 4.73% |
| ZP30 1% | 0.00% | 1.98% | 2.95% | 3.37% | 4.09% | 4.42% | 4.77% |
| ZP30 1.5% | 0.00% | 2.62% | 3.84% | 4.35% | 5.36% | 5.58% | 5.95% |
| ZP31 0.5% | 0.00% | 2.19% | 3.06% | 3.52% | 4.14% | 4.43% | 4.73% |
| ZP31 1% | 0.00% | 2.08% | 3.02% | 3.50% | 4.35% | 4.41% | 4.74% |
| ZP31 1.5% | 0.00% | 2.08% | 3.02% | 3.50% | 4.35% | 4.41% | 4.74% |

TABLE 9

Results of the contact angle measurements

| Specimen | Av. [°] |
|---|---|
| ZA | 0.00 |
| ZP26 0.5% | 123.41 |
| ZP26 1% | 121.69 |
| ZP26 1.5% | 113.97 |
| ZP27 0.5% | 90.85 |
| ZP27 1% | 105.22 |
| ZP27 1.5% | 113.62 |
| ZP28 0.5% | 121.30 |
| ZP28 1% | 118.57 |
| ZP28 1.5% | 115.54 |
| ZP29 0.5% | 118.61 |
| ZP29 1% | 115.77 |
| ZP29 1.5% | 112.69 |
| ZP30 0.5% | 120.63 |
| ZP30 1% | 116.90 |
| ZP30 1.5% | 116.22 |
| ZP31 0.5% | 118.57 |
| ZP31 1% | 115.75 |
| ZP31 1.5% | 106.53 |

A graph of the water absorption of the specimens with 1.5% by weight addition from test series 4 is shown in FIG. 3. The results of the contact angle measurements on the surfaces of all specimens of the test series 4 are shown in FIG. 4.

The water absorption was reduced by the addition of the hydrophobizing agent powders for all specimens examined. The reduction in the water absorption tended to be greater, the higher the content of the hydrophobizing agent powder.

The reduction in the water absorption was decreased most greatly at the three concentrations examined by the addition of powder 28, and the lowest reduction resulted from the addition of powder 26 (0.5% by weight and 1% by weight addition) and powder 27 (1.5% by weight addition).

The averages of the contact angles on the surfaces were all above 90°, predominantly even above 110°. The surfaces could thus be considered to be hydrophobic.

4.5.5 Series 5: Powders 23, 24, 32 and 33, Contents 0.5% by Weight, 1% by Weight and 1.5% by Weight In the fifth series, specimens having a content of 0.5% by weight, 1% by weight and 1.5% by weight addition of the hydrophobizing agent powders 23, 24, 32 and 33 from 4.2 were produced in addition to a reference without addition (ZPR). The designations followed the pattern ZPn 0.5%, ZPn 1% and ZPn 1.5% for n=23, 24, 32, 33, where the respective % value relates to the % by weight mentioned. The water absorption and the contact angles on the surfaces were determined as described above on these specimens. The results of the water absorption determinations are reported in Table 10, and the results of the contact angle measurements are reported in Table 11.

TABLE 10

Results of the water absorption determinations

| | 0 days | 1 day | 3 days | 7 days | 14 days | 21 days |
|---|---|---|---|---|---|---|
| ZPR | 0.00% | 9.63% | 9.89% | 10.03% | 10.22% | 10.27% |
| ZP23 0.5% | 0.00% | 4.20% | 5.36% | 5.83% | 6.48% | 6.93% |
| ZP23 1% | 0.00% | 3.67% | 4.89% | 5.37% | 5.98% | 6.46% |
| ZP23 1.5% | 0.00% | 3.91% | 5.13% | 5.68% | 6.34% | 6.78% |
| ZP24 0.5% | 0.00% | 3.64% | 4.65% | 5.22% | 5.69% | 5.94% |
| ZP24 1% | 0.00% | 2.91% | 3.98% | 4.62% | 5.12% | 5.42% |
| ZP24 1.5% | 0.00% | 2.21% | 3.27% | 3.95% | 4.47% | 4.76% |
| ZP32 0.5% | 0.00% | 3.60% | 4.58% | 5.27% | 5.82% | 6.09% |
| ZP32 1% | 0.00% | 2.81% | 3.75% | 4.39% | 4.86% | 5.14% |
| ZP32 1.5% | 0.00% | 2.18% | 3.15% | 3.87% | 4.43% | 4.73% |
| ZP33 0.5% | 0.00% | 4.00% | 4.93% | 5.49% | 5.95% | 6.20% |
| ZP33 1% | 0.00% | 2.46% | 3.34% | 4.02% | 4.55% | 4.84% |
| ZP33 1.5% | 0.00% | 2.22% | 3.09% | 3.75% | 4.25% | 4.54% |

TABLE 11

Results of the contact angle measurements

| Specimen | Av. [°] |
|---|---|
| ZPR | 19.82 |
| ZP23 0.5% | 94.24 |
| ZP23 1% | 93.87 |
| ZP23 1.5% | 102.54 |
| ZP24 0.5% | 101.60 |
| ZP24 1% | 92.97 |
| ZP24 1.5% | 108.79 |
| ZP32 0.5% | 96.00 |
| ZP32 1% | 103.52 |
| ZP32 1.5% | 116.94 |
| ZP33 0.5% | 91.92 |
| ZP33 1% | 92.51 |
| ZP33 1.5% | 112.47 |

The capillary water absorption of all specimens produced using in series 5 was lower than in the case of the reference ZPR without hydrophobizing agent. The reduction in the water absorption tended to be greater, the higher the content of the hydrophobizing agent powder.

In the case of the specimens with 0.5% by weight and also 1% by weight and 1.5% by weight, the reduction in the water absorption was lowest for the addition of powder 23. The reduction in the water absorption brought about by the addition of powders 24, 32 and 33 in an amount of 0.5% by weight and of 1.5% by weight barely differs. When 1% by weight of hydrophobizing agent powder is added, the water absorption is decreased to the greatest extent by the addition of powder 33.

The averages of the contact angles on the surfaces were all above 90°. The surfaces could thus be considered to be hydrophobic.

LITERATURE CITED

Figure 1:
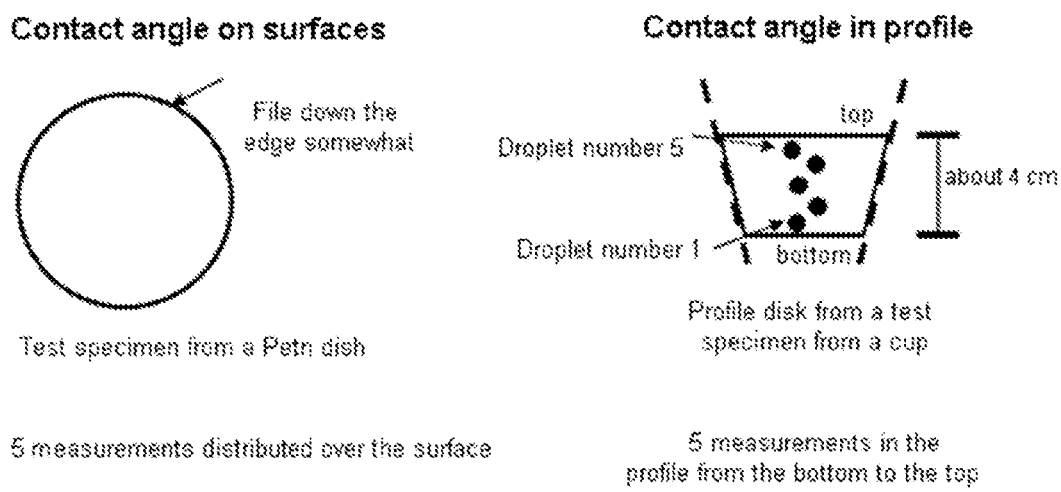
FIG. 1 Schematic depiction of the contact angle measurement points or in-principle sketch for the determination of the contact angle of water on set cement surfaces (at left) and at different heights in the test specimen.
Figure 2:
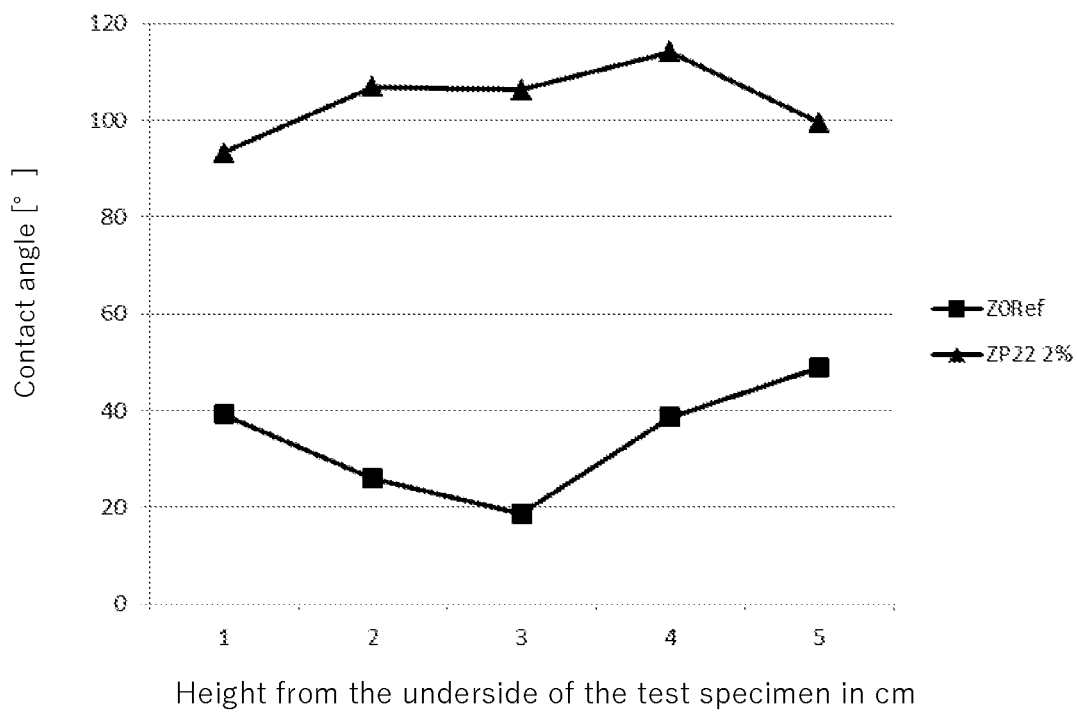
FIG. 2 Graph of the individual measurements of the contact angles in the profile of the specimen with 2% by weight addition of powder 22 of test series 3/contact angle of water as a function of the height in the profile of the test specimen.
Figure 3:
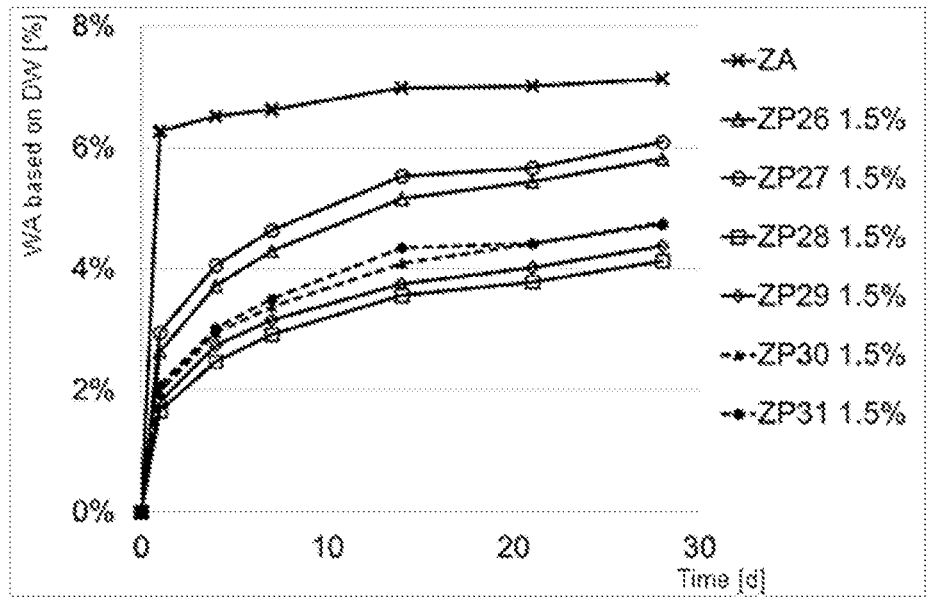
FIG. 3 Graph of the percentage capillary water absorption based on the dry weight of the set cement of the specimens with 1.5% by weight addition of the test series 4 over time, where "d" is used as abbreviation for "day" as unit of time.
Figure 4:
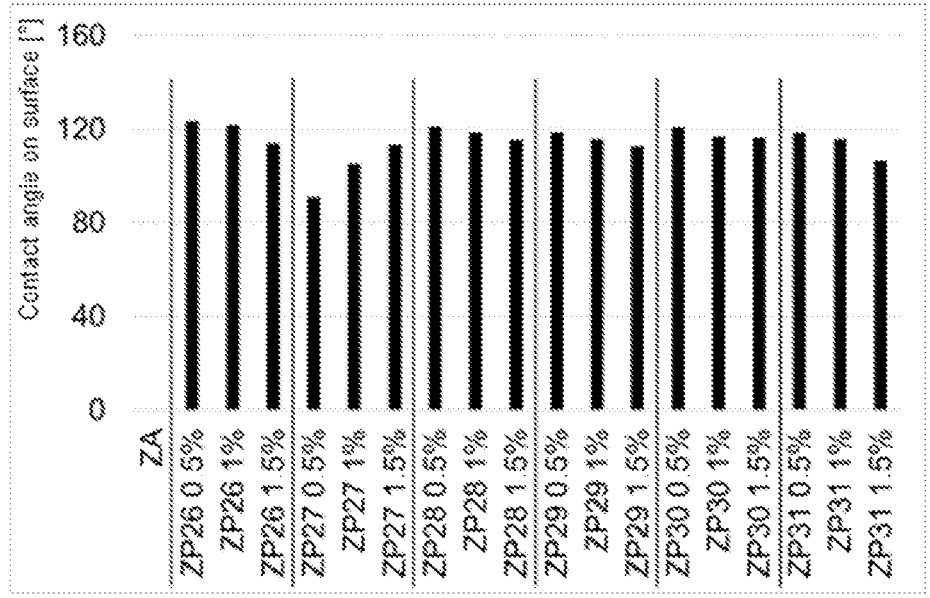
FIG. 4 Averages of the contact angles of water on the surfaces of the set cement disks of test series 4 as a function of the powder used and the amount added.
Figure 5:
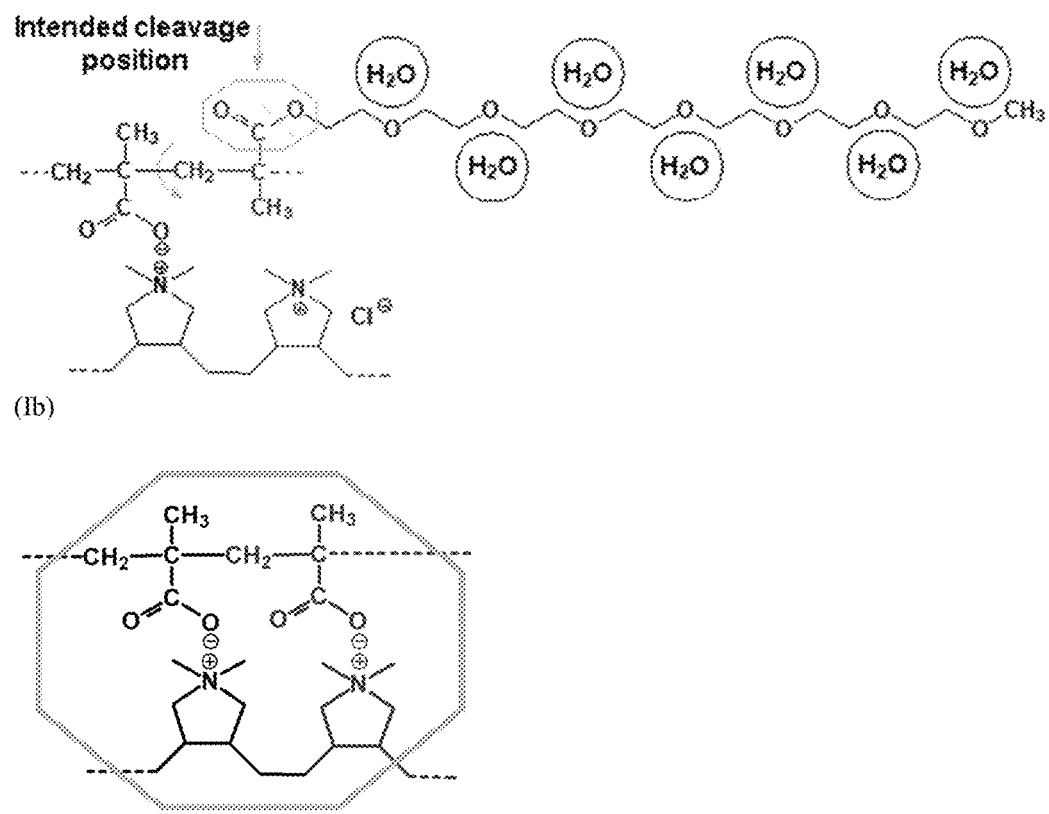
FIG. 5 Hydrophilicity of (Ib) indicated by attached water molecules.

ACI Materials Journal, 115, 5, 685-694 (2018)
Ber. dtsch. chem. Ges. 70, 887 (1937)
Helv. Chim. Acta 36, 1671-1680 (1953)
"Encyclopedia of Polymer Science and Technology", Volume 10, pp. 765-780, (1969)—John Wiley & Sons Inc.
DE 23 33 207 C 3 (1972)
DE 699 20 391 T2 (2006)
EP 0796 826 A1 (1996)
DE 197 47 794 A1 (1997)
EP 1 289 905 B1 (2001)
DE 102 20 659 A1 (2002)
DE 10 2006 046 368 A1
WO 2007/009935 A2
DE 10 2008 041 920 A1
DE 10 2009 022 628 A1
DE 10 2009 028 640 A1
DE 10 2010 003 868 A 1
DE 10 2010 003 870 A1
DE 10 2010 038 768 A1
DE 10 2010 038 774 A1
EP 2415 797 A1 (2011)
WO 2011/121 027 A1
WO 2013/044980 A1

The invention claimed is:

1. A hydrophobizing agent for mineral materials, comprising:
   i) a polyion complex comprising at least one polycation (i.1) and at least one polyanion (i.2), wherein the molar ratio of polycation:polyanion in the polyion complex is ≥1;
   ii) a silicone compound composition; and
   iii) a carrier composition which comprises at least one carrier selected from the group consisting of amorphous silicon dioxide, amorphous agglomerated silicon dioxide, quartz powder, limestone powder, aluminum oxide, illite, iron oxide and mixtures of two or more of these carriers,
   wherein the polycations (i.1) of the polyion complex (i) are present as cation part of poly-N,N-disubstituted-3,4-dimethylenepyrrolidinium chloride salts of the general formula (I):

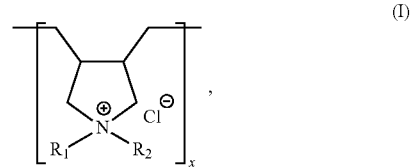

wherein
$R_1$ and $R_2$ are selected independently from the group consisting of a hydrogen atom, a $C_1$-$C_{18}$-alkyl radical and a benzyl radical; and
x is the degree of polymerization;
wherein the silicone compound composition (ii) comprises at least one silicone compound (ii.1) which is selected from the group consisting of monoorgano-$C_1$-$C_{20}$-trialkoysilane, diorgano-$C_1$-$C_{20}$-dialkoxysilane, poly(organo-$C_1$-$C_{20}$-alkoxysiloxane) and mixtures of two or more of these silicone compounds.

2. The hydrophobizing agent as claimed in claim 1, wherein the polyanions (i.2) of the polyion complex (i) are anion part of polycarboxylate ethers based on monounsaturated $C_3$-$C_{10}$-monocarboxylic, dicarboxylic or tricarboxylic acids.

3. The hydrophobizing agent as claimed in claim 1, wherein the polyion complex (i) has a molar ratio of polycations (i.1):polyanions (i.2) of >1.

4. The hydrophobizing agent as claimed in claim 1, wherein the polyion complex (i) has the general formula (Ib),

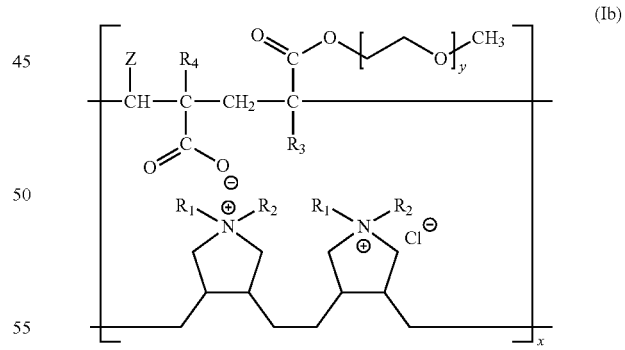

wherein:
x is the degree of polymerization,
y is an integer from 1 to 100,
$R_1$ and $R_2$ are selected independently from the group consisting of a hydrogen atom, a $C_1$-$C_{18}$-alkyl radical and a benzyl radical,
$R_3$ is a hydrogen atom or a $C_1$-$C_4$-alkyl radical,
$R_4$ is selected from the group consisting of a hydrogen atom, a $C_1$-$C_4$-alkyl radical, and a —$CH_2$—Z group, and Z is in each case a hydrogen atom or an N,N-disubstituted-3,4-dimethylenepyrrolidinium radical in which the positive charge on the nitrogen atom of the quaternary pyrrolidinium cation is balanced by a carboxylate anion radical, wherein the N,N-disubstituted-3,4-dimethylenepyrrolidinium has the general formula (Ia.1),

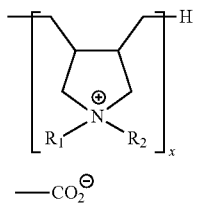

(Ia.1)

wherein $R_1$, $R_2$ and x have the meanings indicated above.

5. The hydrophobizing agent as claimed in claim 1, wherein the polyion complex (i) has a molar ratio of polycations (i.1):polyanions (i.2) of 1.

6. The hydrophobizing agent as claimed in claim 1, wherein the carrier composition (iii) comprises at least amorphous agglomerated silicon dioxide.

7. A process for producing a hydrophobizing agent comprising
   i) a polyion complex comprising at least one polycation (i.1) and at least one polyanion (i.2), where the molar ratio of polycation:polyanion in the polyion complex is ≥1;
   ii) a silicone compound composition; and
   iii) a carrier composition which comprises at least one carrier selected from the group consisting of amorphous silicon dioxide, amorphous agglomerated silicon dioxide, quartz powder, limestone powder, aluminum oxide, illite, iron oxide and mixtures of two or more of these carriers;
   wherein the process comprises the steps:
   a) providing an aqueous solution of the polyion complex (i);
   b) providing the carrier composition (iii);
   c) mixing the aqueous solution of the polyion complex (i) with the carrier composition (iii) to give a first mixture; and
   d) adding the silicone compound composition (ii) which optionally contains a surfactant composition and/or a UV dye composition to the first mixture obtained in (c) to give a coated pulverulent carrier composition of the hydrophobizing agent;
   wherein the polycations (i.1) of the polyion complex (i) are present as cation part of poly-N,N-disubstituted-3,4-dimethylenepyrrolidinium chloride salts of the general formula (I):

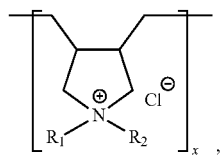

(I)

wherein
$R_1$ and $R_2$ are selected independently from the group consisting of a hydrogen atom, a $C_1$-$C_{18}$-alkyl radical and a benzyl radical; and
x is the degree of polymerization;
wherein the silicone compound composition (ii) comprises at least one silicone compound (ii.1) which is selected from the group consisting of monoorgano-$C_1$-$C_{20}$-trialkoxysilane, diorgano-$C_1$-$C_{20}$-dialkoxysilane, poly(organo-$C_1$-$C_{20}$-alkoxysiloxane) and mixtures of two or more of these silicone compounds.

8. A method of using the hydrophobizing agent as claimed in claim 1, the method comprising using the hydrophobizing agent for the hydrophobizing of mineral binders and/or of compositions which contain mineral binders.

9. A binder composition comprising one or more mineral binder(s) and the hydrophobizing agent as claimed in claim 1.

10. A process for hydrophobizing materials which comprise mineral binders, comprising the steps
    A) providing a binder composition comprising one or more mineral binder(s);
    B) providing the hydrophobizing agent as claimed in claim 1;
    C) mixing the binder composition as per (A) and the hydrophobizing agent as per (B) to give a mixture of the binder composition and the hydrophobizing agent; and
    D) adding water (w) to the mixture of the binder composition and the hydrophobizing agent as obtained in (C) and mixing the components;
    to give a hydrophobized material comprising mineral binders.

11. A hydrophobized material comprising mineral binders and obtained by the process as claimed in claim 10.

12. A hydrophobized material which comprises mineral binders, comprising the reaction product of one or more mineral binder(s), the hydrophobizing agent as claimed in claim 1 and water.

13. The hydrophobizing agent as claimed in claim 1 wherein the polyanions (i.2) of the polyion complex (i) are anion part of polycarboxylate ethers based on monounsaturated $C_3$-$C_{10}$-monocarboxylic, dicarboxylic or tricarboxylic acids selected from the group consisting of methacrylic acid, maleic acid, methylenesuccinic acid, aconitic acid and mixtures of two or more of these acids, wherein the polyanions (i.2) are present as part of alkali metal salts or ammonium salts.

* * * * *